(12) United States Patent
Malladi et al.

(10) Patent No.: US 7,961,700 B2
(45) Date of Patent: Jun. 14, 2011

(54) MULTI-CARRIER OPERATION IN DATA TRANSMISSION SYSTEMS

(75) Inventors: Durga Prasad Malladi, San Diego, CA (US); Serge D. Willenegger, Onnens (CH); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 936 days.

(21) Appl. No.: 11/398,803

(22) Filed: Apr. 5, 2006

(65) Prior Publication Data

US 2006/0274712 A1  Dec. 7, 2006

Related U.S. Application Data

(60) Provisional application No. 60/676,109, filed on Apr. 28, 2005, provisional application No. 60/676,110, filed on Apr. 28, 2005.

(51) Int. Cl.
*H04J 3/00* (2006.01)

(52) U.S. Cl. ........ 370/345; 370/347; 370/350; 455/450; 455/452.2; 455/502

(58) Field of Classification Search .............. 370/332, 370/345, 350; 455/450–452.2, 502, 509, 455/552.1, 69, 522
See application file for complete search history.

(56) References Cited

U.S. PATENT DOCUMENTS

| | | | | |
|---|---|---|---|---|
| 5,539,730 A | * | 7/1996 | Dent | 370/280 |
| 5,577,024 A | * | 11/1996 | Malkamaki et al. | 370/335 |
| 5,642,354 A | * | 6/1997 | Spear | 370/329 |
| 5,732,353 A | * | 3/1998 | Haartsen | 455/450 |
| 5,796,726 A | * | 8/1998 | Hassan et al. | 370/322 |
| 6,038,450 A | * | 3/2000 | Brink et al. | 455/442 |
| 6,381,462 B1 | * | 4/2002 | Charas | 455/452.2 |
| 6,587,444 B1 | | 7/2003 | Lenzo et al. | |
| 6,836,473 B1 | * | 12/2004 | Eriksson | 370/337 |
| 6,982,969 B1 | * | 1/2006 | Carneal et al. | 370/329 |

(Continued)

FOREIGN PATENT DOCUMENTS

EP  1248485  10/2002

(Continued)

OTHER PUBLICATIONS

ETSI Standards; "Universal Mobile Telecommunications System (UMTS); Physical layer procedures (FDD) (3GPP TS 25.214 version 6.5.0 Release 6)"; ETSI TS 125 214 v6.5.0; Mar. 2005; the whole document; XP014027623;ETSI; Sophia Antipolis Cedex, France.

(Continued)

*Primary Examiner* — Sharad Rampuria
(74) *Attorney, Agent, or Firm* — Rupit M. Patel

(57) ABSTRACT

Multi-carrier point-to-multi-point CDMA system implementation reduces hardware changes in legacy single-carrier systems. The number of common downlink channels, such as timing/synchronization and paging channels, is reduced by designating an anchor carrier for transmitting these channels. Procedures for adding carriers and carrier acquisition are simplified through common carrier timing, signaling by the network to the user equipment (UE) of timing offsets and scrambling code selection, and other measures. Channel reuse is employed to minimize changes in asymmetric systems with different numbers of uplink and downlink carriers. Channel Quality Indicator (CQI) field is divided into multiple subfields to enable transmission of multiple CQIs and ACK/NACK indicators on one uplink carrier. Joint and separate scheduling schemes are shown for concurrent scheduling of a data stream transmission to a UE via multiple downlink carriers.

123 Claims, 12 Drawing Sheets

U.S. PATENT DOCUMENTS

| | | | |
|---|---|---|---|
| 6,990,324 B2 * | 1/2006 | Laroia et al. | 455/226.1 |
| 7,664,078 B2 * | 2/2010 | Boyd et al. | 370/336 |
| 2003/0123396 A1 * | 7/2003 | Seo et al. | 370/252 |
| 2003/0224730 A1 * | 12/2003 | Muszynski et al. | 455/62 |
| 2004/0022213 A1 * | 2/2004 | Choi et al. | 370/332 |
| 2004/0248618 A1 | 12/2004 | Yoshii et al. | |
| 2006/0274712 A1 | 12/2006 | Malladi et al. | |

FOREIGN PATENT DOCUMENTS

| | | |
|---|---|---|
| JP | 2004023716 | 1/2004 |
| JP | 2004135304 A | 4/2004 |
| KR | 20030037611 | 5/2003 |
| RU | 2216126 | 11/2003 |
| RU | 2237975 | 10/2004 |
| WO | WO9911088 | 3/1999 |
| WO | WO0115481 | 3/2001 |
| WO | WO03019819 | 3/2003 |
| WO | WO2005013512 | 2/2005 |
| WO | WO2005015942 | 2/2005 |

OTHER PUBLICATIONS

"3rd Generation Partnership Project: Technical Specification Group Radio Access Network; Multiplexing and Channel coding (FDD)", 3GPP TS 25.212 v6.4.0 (Mar. 2005).

"3rd Generation Partnership Project: Technical Specification Group Radio Access Network: Physical channels and mapping of transport channels onto physical channels (FDD)", 3GPP TS 25.211 v6.4.0 (Mar. 2005).

"3rd Generation Partnership Project, Technical Specification Group Radio Access Network; Spreading and modulation (FDD)", 3GPP TS 25.213 v6.2.0 (Mar. 2005).

International Search Report—PCT/US06/015115—International Search Authority, European Patent Office—May 31, 2007.

Written Opinion—PCT/US06/015115—International Search Authority, European Patent Office—May 31, 2007.

International Preliminary Report on Patentability—PCT/US06/015115—The International Bureau of WIPO, Geneva, Switzerland—Oct. 30, 2007.

* cited by examiner

MULTI-CARRIER OPERATION IN DATA TRANSMISSION SYSTEMS

CLAIM OF PRIORITY UNDER 35 U.S.C. §119

The present Application for Patent claims priority to Provisional Application Ser. No. 60/676,109, entitled "Method and Apparatus for Multi-Carrier Wireless Communications", filed on Apr. 28, 2005; the present Application for Patent also claims priority to Provisional Application Ser. No. 60/676,110, entitled "Method and Apparatus for Signaling in Wireless Communications", filed on Apr. 28, 2005. Each of these Provisional Applications is assigned to the assignee of the present Application and is expressly incorporated by reference as if fully set forth herein, including all figures, tables, and claims.

BACKGROUND

1. Field

The present invention relates generally to telecommunications, and, more specifically, to multi-carrier and multi-cell communications in wireless systems.

2. Background

A modern communication system is expected to provide reliable data transmission for a variety of applications, such as voice and data applications. In a point-to-multipoint communications context, known communication systems are based on frequency division multiple access (FDMA), time division multiple access (TDMA), code division multiple access (CDMA), and perhaps other multiple access communication schemes.

A CDMA system may be designed to support one or more CDMA standards, such as (1) the "TIA/EIA-95 Mobile Station-Base Station Compatibility Standard for Dual-Mode Wideband Spread Spectrum Cellular System" (this standard with its enhanced revisions A and B will be referred to as the "IS-95 standard"), (2) the "TIA/EIA-98-C Recommended Minimum Standard for Dual-Mode Wideband Spread Spectrum Cellular Mobile Station" (the "IS-98 standard"), (3) the standard sponsored by a consortium named "3rd Generation Partnership Project" (3GPP) and embodied in a set of documents including Document Nos. 3G TS 25.211, 3G TS 25.212, 3G TS 25.213, and 3G TS 25.214 (the "W-CDMA standard"), (4) the standard sponsored by a consortium named "3rd Generation Partnership Project 2" (3GPP2) and embodied in a set of documents including "TR-45.5 Physical Layer Standard for cdma2000 Spread Spectrum Systems," the "C.S0005-A Upper Layer (Layer 3) Signaling Standard for cdma2000 Spread Spectrum Systems," and the "TIA/EIA/IS-856 cdma2000 High Rate Packet Data Air Interface Specification" (the "cdma2000 standard" collectively), (5) the 1xEV-DO standard, and (6) certain other standards. The standards listed above are incorporated by reference as if fully set forth herein, including annexes, appendices, and other attachments.

Multi-carrier communication systems are being developed to satisfy the constantly increasing demand for wireless services, and in particular for data services. A multi-carrier communication system is a system with the capability to transmit information on two or more carrier frequencies. It should be noted that multi-carrier system capability may exist in both downlink and uplink connections; alternatively, a multi-carrier system may have multi-carrier capability only on uplink or only on downlink. "Downlink" signifies forward direction of information transmission, i.e., transmission from the radio network to user equipment ("UE"), such as a cellular telephone, PDA, or computer. "Uplink" signifies transmission of information in the reverse direction, i.e., from the UE to the radio network.

Importantly, the number of forward link carriers may differ from the number of reverse link carriers in a multi-carrier system. For example, the number of downlink carriers (N) may exceed the number of uplink carriers (M), i.e., $N>M$. The opposite relationship is also possible, albeit less likely, with the number of uplink carriers exceeding the number of downlink carriers, i.e., $M>N$. Of course, the numbers of the uplink and downlink carriers may be the same in a multi-carrier system, i.e., $N=M$. As noted in the immediately preceding paragraph, either N or M may equal 1 in a multi-carrier system.

When the number of uplink carriers is equal to the number of downlink carriers ($N=M$) in a multi-carrier system, the uplink and downlink carriers may be "paired" in a manner similar to that of a single-carrier system, i.e., each uplink/downlink carrier can be paired with a corresponding downlink/uplink carrier. For two paired carriers, overhead (i.e., non-payload or control) information for the downlink carrier is carried by the paired uplink carrier, and overhead information for the uplink carrier is carried by the downlink carrier. When the number of uplink carriers is not the same as the number of downlink carriers ($N \neq M$), one or more "unpaired" carriers may result either on the downlink or on the uplink. In such asymmetric multi-carrier communication systems signaling needs to be adapted so that overhead information is transmitted for the unpaired carriers.

When upgrading previously-deployed communication systems, it is desirable to maintain backward compatibility with legacy equipment. For example, it would be desirable to maintain compatibility of existing cellular telephones when upgrading the radio network. Furthermore, changes to previously-deployed communication systems should preferably be put into place via software upgrades, while minimizing the need for hardware changes. These observations hold equally true when upgrading a wireless communication system from single-carrier to multi-carrier capability.

There is therefore a need in the art for methods and apparatus that preserve backward compatibility of user equipment and reduce the necessity for hardware changes when adding multi-carrier capability to single-carrier communication systems. In particular, a need exists in the art for methods and apparatus that provide signaling for unpaired carriers in multi-carrier systems while preserving compatibility with user equipment designed for single-carrier operation, and while reducing the need for hardware changes in the radio network.

SUMMARY

Embodiments disclosed herein address the above stated needs by providing methods, apparatus, and machine-readable articles of manufacture for implementing multi-carrier capabilities in a point-to-multipoint communication system.

In an embodiment, a wireless user equipment device for communicating with a base transceiver station of a radio network includes a receiver, a transmitter, and a processing circuit. The receiver is configured to receive from the base transceiver station data on a first downlink carrier and on a second downlink carrier, to determine values of a first channel quality indicator for the first downlink carrier, and to determine values of a second channel quality indicator for the second downlink carrier. There is one value of the first channel quality indicator per time slot, and one value of the second channel quality indicator per time slot. The transmitter is configured to transmit on a first uplink carrier to the base transceiver station channel quality indicator values in a CQI field, one CQI field per time slot. The processing circuit is coupled to the receiver and to the transmitter, and is configured to encode the CQI field for each time slot of a first plurality of time slots with (1) a value derived from the value of the first channel quality indicator corresponding to each time slot of the first plurality of time slots, and (2) a value derived from the value of the second channel quality indicator corresponding to each time slot of the first plurality of time slots. In this way, the CQI field transmitted on the first uplink carrier conveys information regarding channel quality of the first downlink carrier and information regarding channel quality of the second downlink carrier for each time slot of the first plurality of time slots.

In an embodiment, a wireless user equipment device for communicating with a base transceiver station of a radio network includes a receiver, a transmitter, and a processing circuit. The receiver is configured to receive from the base transceiver station data on a plurality of downlink carriers, and to determine values of channel quality indicator for each downlink carrier of the plurality of downlink carriers. The transmitter is configured to transmit on a first uplink carrier to the base transceiver station channel quality indicator values in a CQI field, one CQI field per time slot. The processing circuit is coupled to the receiver and to the transmitter, and is configured to select for each time slot a selected downlink carrier from the plurality of downlink carriers. Each downlink carrier of the plurality of downlink carriers is selected once in a cycle period. The processing circuit is also configured to encode the CQI field with the channel quality indicator of the selected downlink carrier for each time slot. In this way the CQI field transmitted on the first uplink carrier conveys information regarding channel quality of each downlink carrier once within the cycle period.

In an embodiment, a wireless user equipment device for communicating with a base transceiver station of a radio network includes a receiver, a transmitter, and a processing circuit. The receiver is configured to receive from the base transceiver station data on a plurality of downlink carriers, and to determine values of channel quality indicator for each downlink carrier of the plurality of downlink carriers. The transmitter is configured to transmit on a first uplink carrier to the radio network data in a FeedBack Indicator (FBI) field, one FBI field per time slot. The processing circuit is coupled to the receiver and to the transmitter, and is configured to encode the FBI field with at least a portion of a value of a channel quality indicator of a first downlink carrier selected from the plurality of downlink carriers.

In an embodiment, a base transceiver station in a radio network communicates with a wireless user equipment device. The base transceiver station includes a receiver, a transmitter, and a processor. The receiver is configured to receive data from the wireless user equipment device on a first uplink carrier, which includes a channel with a CQI field. The transmitter is configured to transmit data to the wireless user equipment device on a first downlink carrier and on a second downlink carrier. The processor, which is coupled to the receiver and to the transmitter, is configured to perform the following functions: (1) receive values in the CQI field, one received value in the CQI field per time slot, (2) adjust output power of the first downlink carrier in accordance with a first subfield of the received value in the CQI field in each time slot (of some plurality of time slots), and (3) adjust output power of the second downlink carrier in accordance with a second subfield of the received value in the CQI field in each time slot.

In an embodiment, a method of operating a wireless user equipment device for communicating with a base transceiver station of a radio network, includes the following steps: (1) receiving from the base transceiver station data on a first downlink carrier and on a second downlink carrier, (2) determining values of a first channel quality indicator for the first downlink carrier, one value of the first channel quality indicator per time slot, (3) determining values of a second channel quality indicator for the second downlink carrier, one value of the second channel quality indicator per time slot, (4) transmitting on a first uplink carrier to the radio network channel quality indicator values in a CQI field, one CQI field per time slot, and (5) encoding the CQI field for each time slot of a first plurality of time slots with a value derived from the value of the first channel quality indicator corresponding to each time slot of the first plurality of time slots, and with a value derived from the value of the second channel quality indicator corresponding to each time slot of the first plurality of time slots.

In an embodiment, a method of operating a wireless user equipment device for communicating with a base transceiver station of a radio network includes the steps of: (1) receiving from the base transceiver station data on a plurality of downlink carriers, (2) determining values of channel quality indicator for each downlink carrier of the plurality of downlink carriers, (3) transmitting on a first uplink carrier to the radio network channel quality indicator values in a CQI field, one CQI field per time slot, (4) selecting for each time slot a selected downlink carrier from the plurality of downlink carriers, each downlink carrier of the plurality of downlink carriers being selected once in a cycle period, and (5) encoding the CQI field with the channel quality indicator of the selected downlink carrier for each time slot. As a result, the CQI field transmitted on the first uplink carrier conveys information regarding channel quality of each downlink carrier once within the cycle period.

In an embodiment, a method of operating a wireless user equipment device for communicating with a base transceiver station of a radio network includes the following steps: (1) receiving from the base transceiver station data on a plurality of downlink carriers, (2) determining values of channel quality indicator for each downlink carrier of the plurality of downlink carriers, (3) transmitting on a first uplink carrier to the radio network data in a FeedBack Indicator (FBI) field, one FBI field per time slot, and (4) encoding the FBI field with at least a portion of a value of a channel quality indicator of a first downlink carrier selected from the plurality of downlink carriers.

In an embodiment, a method of operating a base transceiver station in a radio network includes these steps: (1) receiving data from a wireless user equipment device on a first uplink carrier, the first uplink carrier including a channel with a CQI field, (2) transmitting data to the wireless user equipment device on a first downlink carrier and on a second downlink carrier, (3) reading values received in the CQI field, one value received in the CQI field per time slot, (4) adjusting output power of the first downlink carrier in accordance with a first subfield of the value received in the CQI field in each time slot, and (5) adjusting output power of the second downlink carrier in accordance with a second subfield of the value received in the CQI field in each time slot.

In an embodiment, a method of operating a base transceiver station in a radio network includes transmitting at least one downlink anchor carrier with full 3GPP Release 99 capability, and transmitting at least one downlink non-anchor carrier with partial 3GPP Release 99 capability. The step of transmitting at least one downlink non-anchor carrier overlaps in time with the step of transmitting at least one downlink anchor carrier.

In an embodiment, a method of operating a base transceiver station in a radio network includes transmitting at least one downlink anchor carrier with a first common channel, and transmitting at least one downlink non-anchor carrier that does not carry the first common channel. The two transmitting steps overlap in time.

In an embodiment, a base transceiver station in a radio network includes a receiver for receiving data from user equipment devices on at least one uplink carrier, and a transmitter for transmitting data to user equipment devices on a plurality of downlink carriers. The transmitter is configured to transmit at least one downlink anchor carrier with full 3GPP Release 99 capability. The transmitter is also configured to transmit at least one downlink non-anchor carrier with partial 3GPP Release 99 capability. Transmissions of the at least one downlink anchor carrier and of the at least one downlink non-anchor carrier overlap in time.

In an embodiment, a base transceiver station in a radio network includes a receiver for receiving data from user equipment devices on at least one uplink carrier, and a transmitter for transmitting data to user equipment devices on a plurality of downlink carriers. The transmitter is configured to transmit at least one downlink anchor carrier with a first common channel, and to transmit at least one downlink non-anchor carrier that does not carry the first common channel. Transmissions of the at least one downlink anchor carrier overlap in time with transmissions of the at least one downlink non-anchor carrier.

In an embodiment, a method of operating a base transceiver station in a radio network includes the following steps: (1) transmitting a first downlink anchor carrier with a first common channel, (2) receiving a first signal from a user equipment device, the first signal notifying the base transceiver station that the user equipment device has acquired radio network system to which the base transceiver station belongs using the first downlink anchor carrier, (3) transmitting a second downlink anchor carrier with the first common channel, and (4) after receiving the first signal, sending to the user equipment device a second signal notifying the user equipment device to acquire the radio network system using the second downlink anchor carrier. The step of transmitting the second downlink anchor carrier overlaps in time with the step of transmitting the first downlink anchor carrier.

In an embodiment, a base transceiver station in a radio network includes a receiver for receiving data from user equipment devices on at least one uplink carrier, a transmitter for transmitting data to user equipment devices on a plurality of downlink carriers, and a processor for controlling the transmitter and the receiver. The processor configures the transmitter and the receiver to perform these functions: (1) transmit a first downlink anchor carrier with a first common channel, (2) receive a first signal from a first user equipment device, the first signal notifying the base transceiver station that the user equipment device has acquired radio network system to which the base transceiver station belongs using the first downlink anchor carrier, (3) transmit a second downlink anchor carrier with the first common channel, and (4) after receipt of the first signal, send to the first user equipment device a second signal notifying the first user equipment device to acquire the radio network system using the second downlink anchor carrier.

In an embodiment, a method of operating a user equipment device in a radio network includes receiving from a base transceiver station of the radio network at least one downlink anchor carrier with full 3GPP Release 99 capability, and receiving from the base transceiver station at least one downlink non-anchor carrier with partial 3GPP Release 99 capability. The anchor carrier and the non-anchor carrier are received at the same time.

In an embodiment, a wireless user equipment device for communicating with a base transceiver station of a radio network includes a receiver and a processing circuit. The processing circuit is arranged to (1) configure the receiver to receive from a base transceiver station at least one downlink anchor carrier with full 3GPP Release 99 capability, (2) acquire radio network system using the at least one downlink carrier, and (3) configure the receiver to receive from the base transceiver station at least one downlink non-anchor carrier with partial 3GPP Release 99 capability at the same time as receiving the at least one downlink anchor carrier.

In an embodiment, a method of operating a user equipment device in a radio network includes a step of receiving from a base transceiver station of the radio network at least one downlink anchor carrier with a first common channel. The method also includes a step of acquiring radio network system using the at least one downlink anchor carrier. The method further includes a step of receiving payload data on at least one downlink non-anchor carrier that does not carry the first common channel. The step of receiving payload data overlaps in time with the step of receiving at least one downlink anchor carrier.

In an embodiment, a wireless user equipment device for communicating with a radio network includes a receiver and a processing circuit. The processing circuit is arranged to (1) configure the receiver to receive from a base transceiver station of the radio network at least one downlink anchor carrier with a first common channel, (2) acquire radio network system using the at least one downlink anchor carrier, and (3) configure the receiver to receive (at the same time as receiving the at least one downlink anchor carrier) payload data on at least one downlink non-anchor carrier that does not carry the first common channel.

In an embodiment, a method of operating a base transceiver station in a radio network includes these steps: (1) transmitting a first downlink anchor carrier with a first common channel, (2) transmitting a second downlink carrier, (3) receiving a first signal from a user equipment device, the first signal indicating that the user equipment device has acquired radio network system using the first downlink anchor carrier, and (4) after receiving the first signal, transmitting a second signal, the second signal commanding the user equipment device to receive the second downlink carrier.

In an embodiment, a base transceiver station in a radio network includes a receiver for receiving data from user equipment devices, a transmitter for transmitting data to user equipment devices on a plurality of downlink carriers, and a processor for controlling the receiver and the transmitter. The processor is arranged to configure the transmitter to transmit a first downlink anchor carrier with a first common channel and a second downlink carrier. The processor is also arranged to configure the receiver to receive a first signal from a first user equipment device, the first signal indicating that the first user equipment device has acquired radio network system using the first downlink anchor carrier. The processor is further arranged to configure the transmitter to transmit, after receipt of the first signal, a second signal, the second signal commanding the first user equipment device to receive the second downlink carrier.

In an embodiment, a method of operating a base transceiver station in a radio network includes (1) transmitting a first downlink anchor carrier with a common channel, (2) receiving a first uplink carrier from a user equipment device, (3) transmitting a first signal, the first signal commanding the user equipment device to transmit a second uplink carrier, and (4) synchronizing to the second uplink carrier transmitted by the user equipment device.

In an embodiment, a base transceiver station in a radio network includes a receiver for receiving data, a transmitter for transmitting data on a plurality of downlink carriers, and a processor for controlling the receiver and the transmitter. The processor is configured to (1) cause the transmitter to transmit a first downlink anchor carrier with a common channel, (2) cause the receiver to receive a first uplink carrier from a user equipment device, (3) cause the transmitter to transmit a first signal, the first signal commanding the user equipment device to transmit a second uplink carrier, and (4) synchronize the receiver to the second uplink carrier transmitted by the user equipment device.

In an embodiment, a method of operating a user equipment device in a radio network includes a step of receiving at the user equipment device a first downlink anchor carrier with a common channel from a base transceiver station. The method also includes transmitting at the user equipment device a first uplink carrier to the base transceiver station. The method further includes receiving at the user equipment device a first signal from the base transceiver station, the first signal commanding the user equipment device to transmit a second uplink carrier. The method additionally includes transmitting the second uplink carrier in response to receiving the first signal.

In an embodiment, a wireless user equipment device for communicating with a base transceiver station of a radio network includes a receiver, a transmitter, and a processing circuit. The processing circuit is configured to (1) cause the receiver to receive from the base transceiver station a first downlink anchor carrier with a common channel, (2) cause the transmitter to transmit a first uplink carrier to the base transceiver station, (3) cause the receiver to receive a first signal from the base transceiver station, the first signal commanding the user equipment device to transmit a second uplink carrier, and (4) cause the transmitter to transmit the second uplink carrier in response to receiving the first signal.

These and other embodiments and aspects of the present invention will be better understood with reference to the following description, drawings, and appended claims.

DETAILED DESCRIPTION

Figure 1:
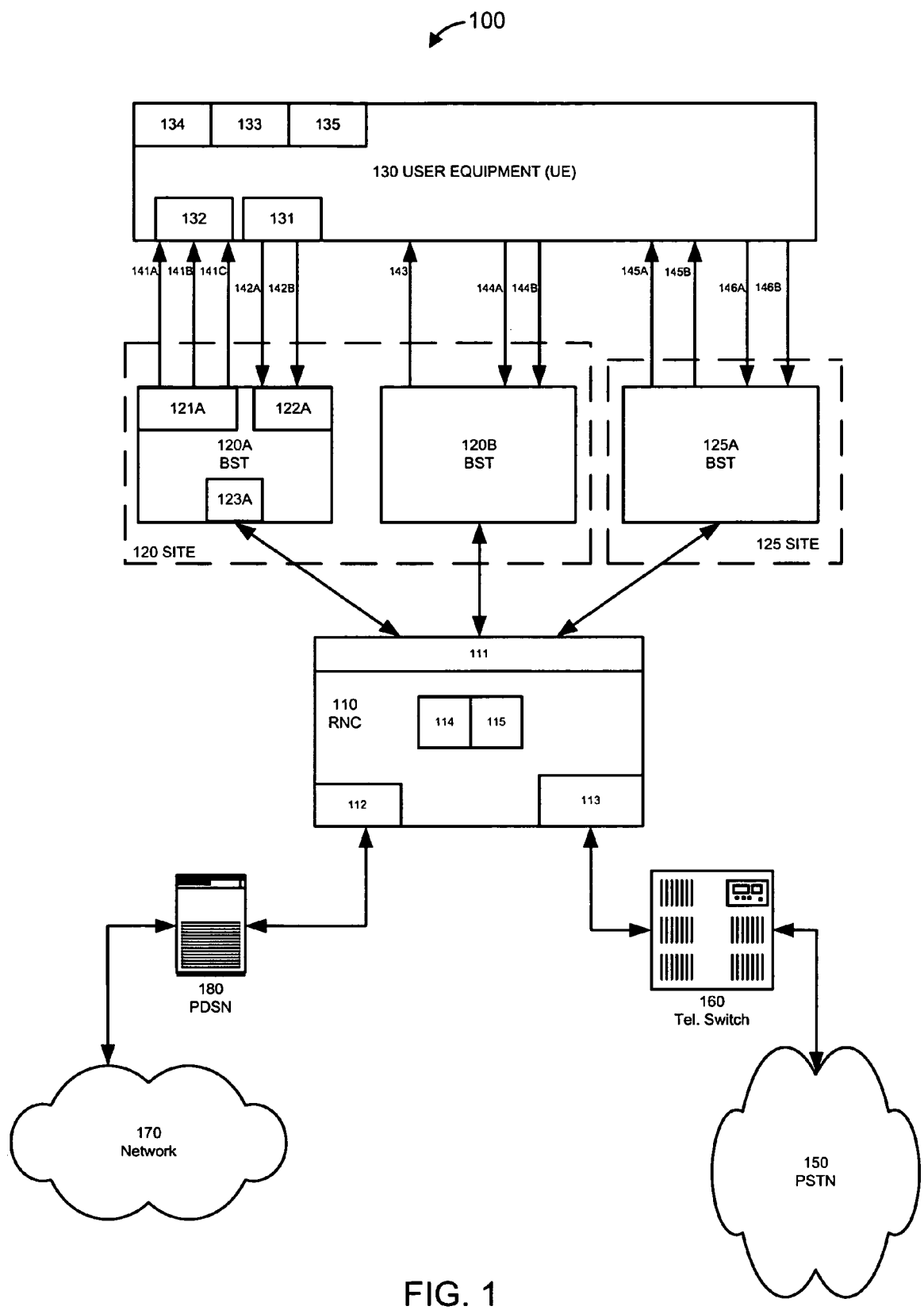
FIG. 1 illustrates selected components of a multi-carrier communication network.

In this document, the words "embodiment," "variant," and similar expressions are used to refer to particular apparatus, process, or article of manufacture, and not necessarily to the same apparatus, process, or article of manufacture. Thus, "one embodiment" (or a similar expression) used in one place or context can refer to a particular apparatus, process, or article of manufacture; the same or a similar expression in a different place can refer to a different apparatus, process, or article of manufacture. The expression "alternative embodiment" and similar phrases are used to indicate one of a number of different possible embodiments. The number of possible embodiments is not necessarily limited to two or any other quantity.

The word "exemplary" is used herein to mean "serving as an example, instance, or illustration." Any embodiment described herein as "exemplary" is not necessarily to be construed as preferred or advantageous over other embodiments. All of the embodiments described in this description are exemplary embodiments provided to enable persons skilled in the art to make or use the invention, and not to limit the scope of legal protection afforded the invention, which is defined by the claims and their equivalents.

A subscriber station, referred to herein as "user equipment," "UE," or "user equipment device," may be mobile or stationary, and may communicate with one or more base transceiver stations. A user equipment device may be any of a number of types of devices, including but not limited to PC card, external or internal modem, wireless telephone, and a personal digital assistant (PDA) with wireless communication capability. User equipment transmits and receives data packets to or from a radio network (base station) controller through one or more base transceiver stations.

Base transceiver stations and base station controllers are parts of a network called "radio network," "RN," "access network," or "AN." A base station controller may also be referred to as a radio network controller or "RNC." Radio network may be a UTRAN or UMTS Terrestrial Radio Access Network. The radio network may transport data packets between multiple user equipment devices. The radio network may be further connected to additional networks outside the radio network, such as a corporate intranet, the Internet, or a conventional public switched telephone network ("PSTN"), and may transport data packets between each user equipment device and such outside networks.

In a single-carrier wireless communication system, the uplink and downlink carriers are "paired." This means that the signaling (control) information and timing for the uplink carrier are transmitted on the downlink carrier, and vice versa. In a symmetrical multi-carrier system with the number of uplink carriers (M) equal to the number of downlink carriers (N), the uplink and downlink carriers may be "paired" in a similar manner. In other words, each uplink/downlink carrier may be paired with a corresponding downlink/uplink carrier. A "paired carrier" is thus a frequency carrier for which there is a corresponding associated carrier in the opposite direction. Consequently, a paired downlink carrier has an associated uplink carrier; a paired uplink carrier has an associated downlink carrier. The PHY (physical) channel timing relationships and control data for paired carriers in multi-carrier system embodiments described in this document are generally the same as those for the currently-defined single-carrier systems.

An "unpaired carriers" is a carrier that is not a paired carrier. Typically, unpaired carriers result when the multi-carrier system is asymmetrical, i.e., the number of downlink carriers is not equal to the number of uplink carriers (N≠M).

An "anchor carrier" is generally a carrier that contains full 3GPP Release 99 capability within a cell, such as transmission of SCH, P-CCPCH, and S-CCPCH channels, and supporting reception of UE random access by means of the PRACH. An anchor carrier carries at least timing (SCH) of the cell in which it is operational. The anchor carrier concept should become better understood from the following description.

The expression "cold acquisition" and similar phrases denote system acquisition by user equipment. For example, a UE device can perform a cold acquisition procedure when it is powered up within a cell, or when it enters an area served by the cell, acquiring the sole anchor carrier in the cell, or one of several anchor carriers in the cell.

The expression "warm acquisition" and similar phrases denote the addition of downlink carriers in a multi-carrier cell.

A "common channel" is a channel that is not dedicated to a specific terminal; a common channel may be broadcast downlink to a plurality of User Equipment devices within a cell. A channel does not change its "common" nature merely because it is received by only one terminal, or even if it is not received by any terminals. A "dedicated channel" is a channel dedicated to a specific terminal.

A "delta update" of a variable is a measure of change in the variable from one measurement period (e.g., a time slot) to the next measurement period.

FIG. 1 illustrates selected components of a communication network 100, which includes a radio network controller 110 coupled to base station wireless transceivers 120A, 120B, and 125A. The base transceiver stations 120A and 120B are part of a site 120A and correspond to different sectors (cells) of this site. The base transceiver station 125A is part of a different site 125.

The base transceiver station 120A is configured to send data to a user equipment device 130 through one or more downlink wireless carriers 141A, 141B, and 141C; the transceiver 120A is further configured to receive data from the UE 130 through one or more uplink wireless carriers 142A and 142B. The base transceiver station 120B is configured to send data to the UE 130 through downlink wireless carrier 143, and to receive data from the UE 130 through one or more uplink wireless carriers 144A and 144B. The base transceiver station 125A is configured to send data to and receive data from the UE 130 using, respectively, downlink wireless carriers 145A/B and uplink wireless carriers 146A/B. Each of the carriers 141-146 corresponds to a different frequency. The downlink data streams from different transceivers (cells) to the UE 130 may be different, but there may also be periods when several transceivers transmit the same data to the UE concurrently.

The radio network controller 110 is coupled to a public switched telephone network (PSTN) 150 through a telephone switch 160, and to a packet switched network 170 through a packet data server node (PDSN) 180. Data interchange between various network elements, such as the radio network controller 110 and the packet data server node 180, can be implemented using any number of protocols, for example, the Internet Protocol (IP), an asynchronous transfer mode (ATM) protocol, T1, E1, frame relay, other protocols, and combinations of protocols.

The communication network 100 provides both data communication services and telephone (voice) services to the UE 130. In alternative embodiments, the communication network 100 may provide only data or only telephone services. In yet other alternative embodiments, the communication network 100 may provide services such as video transmission services, either alone or in combination with telephone services, and other services.

The UE 130 may be or include a wireless telephone, wireless modem, personal digital assistant, wireless local loop apparatus, and other communication devices. The UE 130 is configured to communicate data in the forward and reverse directions using at least one transmission protocol, such as a protocol consistent with the wireless packet transmission protocols described above. The UE 130 may include a wireless transmitter 131, wireless receiver 132, a controller 133 (e.g., a microcontroller) executing program code, memory devices 134 (e.g., RAM, ROM, PROM, EEPROM, and other memories, some of which store the program code), human interface devices 135 (e.g., display, keypad, keyboard, pointing device), and other components. In some variants, a user equipment device may include multiple instances of these components, for example, multiple receivers and/or multiple transmitters.

Each of the base transceiver stations 120A/B and 125 includes one or more wireless receivers (such as a receiver 122A of the transceiver 120A), one or more wireless transmitters (such as a transmitter 121A of the transceiver 120A), and a base station controller interface (such as an interface 123A). A receiver/transmitter pair of each base station is configured by a processor operating under control of program code to establish forward and reverse links with the UE 130 in order to send data packets to and receive data packets from the UE 130. In the case of data services, for example, the base transceiver stations 120/125 receive forward link data packets from the packet switched network 170 through the packet data server node 180 and through the radio network controller 110, and transmit these packets to the UE 130. The base transceiver stations 120/125 receive reverse link data packets that originate at the UE 130, and forward these packets to the packet switched network 170 through the radio network controller 110 and the packet data server node 180. In the case of telephone services, the base transceiver stations 120/125 receive forward link data packets from the telephone network 150 through the telephone switch 160 and through the radio network controller 110, and transmit these packets to the UE 130. Voice carrying packets originating at the UE 130 are received at the base transceiver stations 120/125 and forwarded to the telephone network 150 via the radio network controller 110 and the telephone switch 160.

The radio network controller 110 includes one or more interfaces 111 to the base transceiver stations 120/125, an interface 112 to the packet data server node 180, and an interface 113 to the telephone switch 160. The interfaces 111, 112, and 113 operate under control of one or more processors 114 executing program code stored in one or more memory devices 115.

As illustrated in FIG. 1, the network 100 includes one public switched telephone network, one packet switched network, one base station controller, three transceivers, and one user equipment device. A person skilled in the art would recognize, after perusal of this document, that alternative embodiments in accordance with aspects of the invention need not be limited to any particular number of these components. For example, a lesser or a greater number of base transceiver stations and user equipment devices may be included in some embodiments. Furthermore, the communication network 100 can connect the user equipment device 130 to one or more additional communication networks, for example, a second wireless communication network having a number of wireless user equipment devices.

It should be understood that data and all or some of the overhead information may be transmitted to and from the UE 130 simultaneously on multiple carriers. Furthermore, data and overhead information may be transmitted to and from the UE 130 on carriers from different cells, which may belong to the same site or to different sites.

In the wireless portion of the communication network 100, multi-carrier operation is such that some carriers are paired, while others are unpaired. Carrier pairs include (1) carriers 141A and 142A, (2) carriers 141B and 142B, (3) carriers 143 and 144A, (4) carriers 145A and 146A, and (5) carriers 145B and 146B. The unpaired carriers are 141C on the downlink, and 144B on the uplink.

In accordance with the 3GPP specification TS 25.213, "Spreading and Modulation (FDD)," the Enhanced Relative Grant channel ("E-RGCH") and Enhanced Hybrid ARQ Indicator channel ("E-HICH") assigned to the UE 130 use the same channelization code.

Multi-carrier operation is configured so that the timing of the PHY channels for the paired carriers is the same as that for a single carrier system. In other words, the timing of all the downlink channels is referenced to the timing of the Primary Common Control Physical channel ("P-CCPCH") or the Synchronization ("SCH") channels, and the timing of the uplink carriers is referenced to the timing of the associated (paired) downlink channels. For a complete description of timing of the PHY channels, the interested reader should refer to the 3GPP specification TS 25.211, entitled "Physical channels and mapping of transport channels onto physical channels (FDD)." For convenience, summaries of timing on the downlink and uplink channels are presented below in Tables 1 and 2, respectively.

TABLE 1

Summary of Timing of PHY DL channels

| Channel | Direct Reference | Timing w.r.t. Ref |
|---|---|---|
| SCH | Nominal | 0 |
| Any CPICH | Nominal | 0 |
| P-CCPCH | Nominal | 0 |
| $k^{th}$ S-CCPCH | Nominal | $\tau_{S\text{-}CCPCH,k}$ after |
| PICH | Associated S-CCPCH | 3 slots before |
| AICH | Nominal | 0 |
| MICH | Associated S-CCPCH | 3 slots before |
| $n^{th}$ DPCH | Nominal | $\tau_{DPCH,n}$ after |
| $p^{th}$ F-DPCH | Nominal | $\tau_{F\text{-}DPCH,p}$ after |
| HS-SCCH | Nominal | 0 |
| HS-PDSCH | Nominal | 2 slots after |
| E-HICH | Nominal | $\tau_{E\text{-}HICH}$ after [indirectly depends on associated (F-)DPCH] |
| E-RGCH | Nominal | $\tau_{E\text{-}RGCH} = \tau_{E\text{-}HICH}$ after (serving cell) 2 slots after (non-serving cell) |
| E-AGCH | Nominal | 2 slots after |

TABLE 2

Summary of Timing of PHY UL channels

| Channel | Direct Reference | Timing w.r.t Ref |
|---|---|---|
| RACH | Nominal | 1.5 or 2.5 access slots before |
| DPCCH/DPDCH E-DPCCH/E-DPDCH | Associated (F-)DPCH | $T_0$ + 1024 chips later |
| HS-DPCCH | HS-PDSCH | $T_0$ + 7.5 slots after |

Note:
$T_0$ is the Node-B to UE propagation delay

In embodiments, time reference within a cell is common across all the carriers of the cell. Therefore, the downlink timing reference, i.e., timing of the P-CCPCH or SCH, is the same for all downlink carriers in a given cell. Furthermore, because synchronizing timing across different cells of a Node-B (site) involves little or no cost, timing of the P-CCPCH or SCH is the same for all carriers in a given site, in some embodiments, for example, in the site 120 of FIG. 1.

Synchronizing the timing within the same Node-B eliminates the need to transmit to the UE (e.g., the UE 130) a number of common channels on multiple downlink carriers within the particular site. These channels include the following:

1. The Primary and Secondary Synchronization channels (SCH) that allow the UE 130 to perform initial system acquisition.
2. The Primary Common Control Physical channel (P-CCPCH), which carries the system information, including the Broadcast Transport channel ("BCH").
3. The Secondary Common Control Physical channel ("S-CCPCH"), which carries the Paging ("PCH") and the Forward Access ("FACH") transport channels. It should be noted that, to increase data transmission capabilities over FACHs, additional channels can be allocated on other carriers (i.e., carriers other than the carrier with the S-CCPCH). Such channels may include the Paging Indicator Channel or "PICH," if the S-CCPCH carrying the PCH is transmitted over a single carrier. Such channels may further include the MBMS Indicator Channel or "MICH," if the S-CCPCH carrying the MBMS contents is transmitted over a single carrier.
4. The Dedicated Physical Data Channel ("DPDCH"). (This is so because the UE is expected to use a single carrier for regular DPDCH transmissions; multi-carrier transmissions may be limited to the Enhanced Dedicated Channel or "E-DCH").

After acquiring the system, a UE (e.g., the UE 130) may attempt system access using one carrier. The choice of carrier may be limited to a particular carrier, for example, the carrier paired with the anchor carrier on which the UE acquired the system. Alternatively, the UE may attempt to access the system using another carrier supported by the UE. The UE may expect reception of the corresponding Access Indicator Channel ("AICH") from the carrier used for transmission of the Physical Random Access Channel "PRACH").

In some embodiments, some or all of the common (non-dedicated) channels within a cell are transmitted downlink only on the anchor carrier(s) within a cell; other (non-anchor) carriers do not carry these channels. For example, timing and/or paging may be transmitted only on the anchor.

Characterization and use of a carrier as an anchor carrier are generally semi-static in nature, because they do not change dynamically, from frame to frame. Rather, they exhibit time stability on the order of hundreds of milliseconds or even minutes or longer. A particular anchor carrier may also be a permanent characteristic of a cell.

The radio network may cause the UE to switch from one anchor carrier to another. For example, a signaling message may be transmitted to the UE to force the UE to acquire the system on a different anchor carrier. The original anchor carrier may then remain an anchor carrier, be converted into a non-anchor carrier, or be dropped.

When a downlink carrier is added by the network to a cell, the network may notify a UE device within the cell of the addition of the new downlink carrier. The new carrier may have the same timing as one of the existing carriers (e.g., the anchor carrier), or have a known timing offset with respect to the existing carrier. If the timing offset is known, the transceiver may indicate the offset to the UE on an existing channel, in order to facilitate synchronization of the UE to the new carrier. The transceiver may also signal to the UE on an existing channel the particular scrambling code used on the new carrier, or indicate to the UE that the new carrier's scrambling code is the same as the scrambling code used on one of the other carriers. If the new channel is an anchor channel, the transceiver sends an appropriate signal the UE, so that the UE will switch to the new anchor carrier upon acquiring the new anchor carrier.

When the UE acquires the new carrier (synchronizes to it), the UE can signal this event to the transceiver. For example, the UE may signal the transceiver inband, or using an existing channel/field, such as a CQI (channel quality indicator) field or ACK/NAK field. If the new carrier is an anchor carrier, the UE switches and camps on this new anchor carrier, receiving its timing, paging, and other system information through the downlink channels of the new anchor carrier.

When an uplink carrier is added to a UE, the network may need to indicate to the UE that the transceiver has synchronized to the new uplink carrier. Thus, a new downlink channel for transmitting such indications may be needed. In some embodiments, multiples of E-HIGH channels on the downlink are defined and allocated to the same UE for this purpose.

Focusing now on multi-carrier channels for downlink operation, the data payload channels for delivering data (which is generally non-voice data) to the UE is the High-Speed Physical Downlink Shared Channel ("HS-PDSCH"). The supporting channels include High-Speed Shared Control Channel ("HS-SCCH"), Fractional Dedicated Physical Channel ("(F-)DPCH" or "F-DPCH," which is a stripped DPCH that contains only power control information), E-HICH, E-RGCH, and Enhanced Absolute Grant Channel ("E-AGCH").

Generally, N High-Speed Shared Control Channels are needed, one per downlink carrier. As regards the Fractional Dedicated Physical Channels, M such channels may be needed to provide uplink power control for the M uplink carriers. Similarly, M Enhanced Hybrid ARQ Indicator Channels may be needed to send acknowledgements ("ACKs") and negative acknowledgements ("NAKs") for each Enhanced Dedicated Physical Channels ("E-DPCHs") on each of the M uplink carriers. Also, M Enhanced Relative Grant Channels may be needed for each of the E-DPCHs.

The Absolute Grant messages for a multi-carrier UE with M uplink carriers may be transmitted on M independent AGCH PHY channels (in the same or different carriers), or these messages may be transmitted on a single PHY channel on a particular downlink carrier. To that end, the E-DCH Radio Network Temporary Identifier ("E-RNTI") can append the notion of carrier on top of the notion of UE, adding this additional dimensionality to the message and making it possible to be transmitted on a single carrier without losing multi-carrier capability. Thus, a UE can have more than one associated E-RNTI, e.g., one for each uplink carrier on which the UE is allowed to transmit. For the Enhanced Absolute Grant Channel(s), therefore, either 1 or M such channels may be needed, depending, respectively, on whether each UE absolute grant applies overall (in the aggregate) to all the E-DPCHs on all the uplink carriers, or separately to each uplink carrier's E-DPCH.

When the number of uplink carriers equals the number of downlink carriers (N=M), each of the downlink carriers has an associated (paired) uplink carrier, and vice-versa. PHY procedures for this case (e.g., power control, synchronization, HS-DSCH, E-DCH, and related procedures) need not differ from the corresponding procedures in the single carrier case. In the cell 125A of FIG. 1, for example, each downlink channel that supports an uplink carrier can be transmitted on the downlink carrier paired with the particular uplink carrier. Thus, the downlink carrier 145A can support the uplink carrier 146A, while the downlink carrier 145B can support the uplink carrier 146B. Therefore, in this case there may be no need to allocate on the downlink carrier support channels in addition to those already defined for the single-carrier case.

Similarly, when the number of downlink carriers exceeds the number of uplink carriers (N>M), each of the uplink carriers has an associated (paired) downlink carrier. The paired downlink carriers will serve as conduits for the supporting (F-)DPCH, E-HICH/E-RGCH and E-AGCH (in case of M AGCH channels being used), with (N−M) downlink unpaired carriers carrying HS-PDSCHs and associated HS-SCCHs. In the cell 120A of FIG. 1, for example, downlink support channels for a particular uplink channel can be present on the downlink carrier paired with the particular uplink channel. Thus, the downlink carrier 141A can support the uplink carrier 142A, while the downlink carrier 141B can support the uplink carrier 142B. In this asymmetric case there also may be no need to allocate on the downlinks carrier support channels in addition to those already defined for the single-carrier case.

Note that in the N>M case, the timing of the downlink channels HS-PDSCH and HS-SCCH in the (N−M) unpaired downlink carriers is well defined, because, for the downlink, the timing of all the PHY changes is referenced to the nominal timing of the P-CCPCH or SCH of the anchor carrier. Thus, the timing of the channels in the (N−M) case is defined when the imposed timing constraint discussed above (common timing for the downlink carriers) is observed.

When the number of downlink carriers is smaller than the number of uplink carriers (N<M), there are (M−N) unpaired uplink carriers. Therefore, (M−N) additional (F-)DPCHs may need to be allocated within the N downlink carriers; if absolute grants are transmitted on a per-carrier basis, then (M−N) additional E-AGCHs may also need to be allocated in the N downlink carriers. Moreover, (N<M)×2 additional signatures may be needed for E-HICHs and E-RGCHs on the unpaired uplink carriers. In the cell 120B of FIG. 1, for example, one of the uplinks carriers, e.g., 144B, is unpaired. It follows that in this asymmetric case the support channels for the uplink carrier 144B cannot be allocated on the corresponding paired downlink carrier in the usual manner, and need be allocated on one or more of the existing downlink carriers. For example, the support channels for the uplink carrier 144B may be allocated on the downlink carrier 143 (which is paired with the uplink carrier 144A).

The (M−N) sets of additional channels ((F-)DPCH, E-HICH/E-RGCH and, optionally, E-AGCH), are related to E-DCH transmissions on the uplink. Therefore, the cells in a particular UE's E-DCH Active Set of each carrier may transmit to the UE the supporting E-DCH feedback information and the reverse link TPC commands. For cells belonging to the same Node-B, the transmission of these channels may take place in the same carriers. For implementation reasons, it may also be beneficial that the carriers for transmission of these channels be the same for different Node-Bs. The Hybrid ARQ indicator, which is transmitted on the downlink, is essentially an ACK/NAK channel for the uplink. Additional E-HIGHs may be defined on one or more downlink carriers, each being offset in time by some predefined time period (i.e., the number of chips of the scrambling code). For example, the additional E-HIGHs may be offset from each other by an equal time period.

The timing of the E-HICH is indirectly related to the timing of the associated (F-)DPCH. See Tables 1 and 2 above. The timing of the E-RGCH for the serving cell coincides with the timing of the E-HICH, and therefore is also related to the (F-)DPCH. The timing of the E-RGCH from a non-serving cell as well as the timing of the E-AGCH channel are absolute with respect to the nominal timing (2 slots after). In addition, as previously noted, the E-AGCH may be transmitted on a single carrier. Therefore, the (M−N) additional (F-)DPCHs (on top of the N ones corresponding to the paired carriers) will have a particular timing multiple of 256 chips, which will constitute an indirect reference for the E-HICH and the E-RGCH from the serving cell. Thus, the timing of the support channels in the (M−N) case is defined when the imposed timing constraint discussed above (common timing for the downlink carriers) is observed.

Note that multiple F-DPCHs on a given carrier may be orthogonally time-multiplexed within the same channelization code by using different timing offsets, for example, timing offsets in multiples of 256 chips. Therefore, in some embodiments the additional F-DPCHs are time multiplexed within a set of downlink carriers. In certain alternative embodiments, different channelization codes are used for the additional F-DPCHs with the timing being the same or different than that of the paired F-DPCH, e.g., the F-DPCH of the anchor carrier.

Because multiplexing in time sharing manner within the same channelization code is possible when allocating F-DPCHs, this type of allocation may be preferable to allocation of DPCHs.

Turning next to multi-carrier channels for uplink operation, payload data is delivered from the UE to the base transceiver stations via Enhanced Dedicated Physical Data Channels ("E-DPDCHs"). Generally, there can be M such channels, one per uplink reference. The supporting downlink channels may include Dedicated Physical Control Channels ("DPCCHs"), Enhanced Dedicated Physical Control Channels ("E-DPCCHs"), and High-Speed Dedicated Physical Control Channels ("HS-DPCCHs"). There are generally M DPCCHs, because one such channel per uplink carrier is transmitted during all times of operation. There also are generally M E-DPCCHs, each one being transmitted when its associated E-DPDCH is active. Finally, N HS-DPCCHs are generally used to provide ACK/NACK and CQI information for each of the N downlink carriers.

When the number of uplink carriers equals the number of downlink carriers (N=M), each of the uplink carriers has an associated (paired) downlink carrier, and vice-versa. PHY procedures for this case (i.e., Power Control, synchronization, HS-DSCH, and E-DCH related procedures) need not differ from corresponding procedures in the single carrier case. In the cell 125B of FIG. 1, for example, each uplink channel that supports a downlink carrier can be transmitted on the uplink carrier paired with the particular downlink carrier.

Thus, the uplink carrier 146A can support the downlink carrier 145A, while the uplink carrier 146B can support the downlink carrier 145B. Therefore, in this case there may be no need to allocate on the uplinks carrier support channels in addition to those already defined for the single-carrier case.

Similarly, when the number of uplink carriers exceeds the number of downlink carriers (M>N), each of the downlink carriers has an associated (paired) uplink carrier. The paired uplink carriers can serve as conduits for the HS-DCCH and the TPC commands for the N downlink carriers. In the cell 120B of FIG. 1, for example, uplink support channels for a particular downlink carrier can be present on the uplink carrier paired with the particular downlink carrier. Thus, the uplink carrier 144A can support the downlink carrier 143. In this asymmetric case there also may be no need to allocate on the uplink carriers support channels in addition to those already defined for the single-carrier case.

In the M>N case, there are (M−N) unpaired uplink carriers. The timing of the channels in these unpaired carriers (DPCCH and E-DPCCH timing) is well defined because it is referenced to (M−N) additional (F-)DPCHs allocated within the N downlink carriers. Note that for this case, the timing of each of the unpaired uplink carriers is referenced to the downlink carrier with the associated (F-)DPCH.

When the number of downlink carriers exceeds the number of uplink carriers, there are (N−M) unpaired downlink carriers in addition to the M paired downlink carriers. The timing of the HS-DPCCHs of the (N−M) downlink unpaired carriers is referenced to the timing of the associated downlink HS-DPCHs and, therefore, the timing is well defined.

In this asymmetric case (N>M), CQI and ACK/NACK information for the (N−M) unpaired downlink carriers needs to be conveyed from the UE to the radio network.

Figure 2:
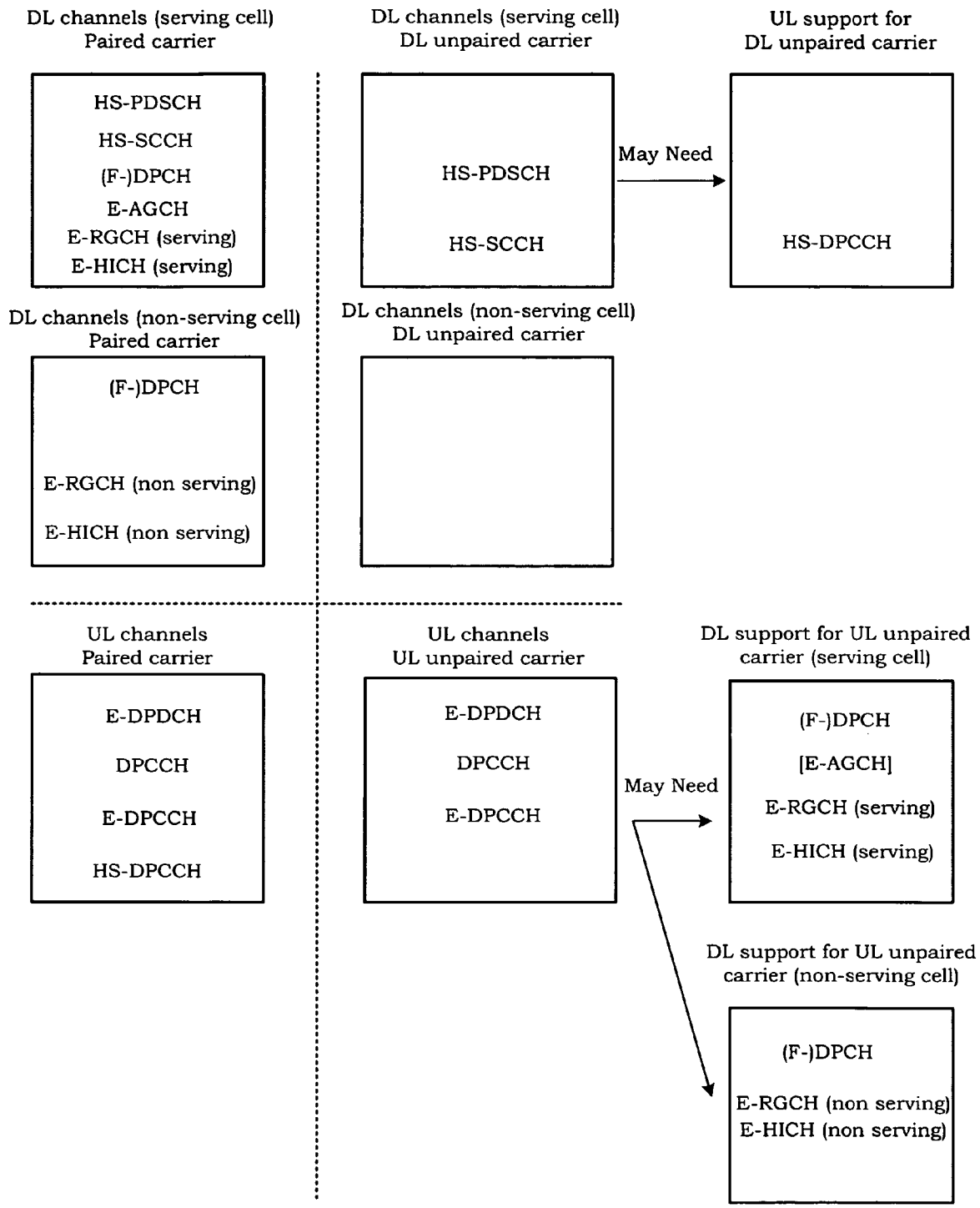
FIG. 2 is a summary of combinations of transmit channels in a multi-carrier communication system.

FIG. 2 summarizes possible combinations of transmit channels on the downlink and uplink, for both serving and non-serving cells, and for both paired and unpaired carriers. In FIG. 2, the serving cell for HS-DSCH is considered to be the same as for E-DCH.

We now describe several system/method variants that allow a UE (e.g., the UE 130) to send CQI and ACK/NAK information for the unpaired downlink carriers to the radio network (e.g., to the transceiver 120A) in the (N>M) case.

In one variant, the HSDPA feedback information (such ACK/NAK and CQI channels) of the (N−M) unpaired downlink carriers is conveyed to the appropriate transceiver via (N−M) additional code division multiplexed HS-DPCCHs within the M uplink carriers. This variant may necessitate some hardware changes at the Node-B modem.

The additional code division multiplexed HS-DPCCHs employ additional channelization codes within a carrier. Note that the single-carrier system defined by the 3GPP specification TS 25.213 specifies the SF 256 channelization codes and the quadrature phase (depending on the number of DPDCHs) to be used by the single HS-DPCCH that may be transmitted from a UE. Therefore, this variant employs the channelization codes and the quadrature phases in addition to those already defined in the 3GPP specification TS 25.213. Conceptually, the additional HS-DPCCHs need not differ from the HS-DPCCHs of the paired carriers of the multi-carrier system (such as the system 100 shown in FIG. 1), or from the HS-DPCCH of the current single-carrier systems. The timing of these additional channels may be tied to the associated downlink HS-PDSCH.

In order to limit the impact of the additional code division multiplexed channels on the peak-to-average ratio of the transmit waveform, the (N−M) additional HS-DPCCHs may be spread across the M uplink carriers. For example, the additional HS-DPCCHs may be spread across the M uplink carriers substantially evenly.

In another variant, the frequency of CQI messages for each downlink carrier is lowered to transmit the CQI messages for all the downlink carriers within the available uplink carrier(s). Consider the case when M=1 and N=4. The CQI field on the single uplink carrier may be used to transmit to the radio network CQIs for each of the four downlink carriers, one a time. For example, in time slot 1, the UE transmits CQI[1] that indicates channel quality of a first DL carrier. (Time slot is typically about 0.66 ms, as defined in applicable CDMA standard.) In slot 2 (which immediately follows slot 1), the UE transmits CQI[2] that indicates channel quality of a second DL carrier. In slot 3 (which immediately follows slot 2), the UE transmits CQI[3] that indicates channel quality of a third DL carrier. In slot 4 (which immediately follows slot 3), the UE transmits CQI[4] that indicates channel quality of a fourth DL carrier. The sequence is then repeated. In this way CQI for each of the four downlink carriers is transmitted on the uplink carrier, albeit with reduced frequency.

Figure 3A:
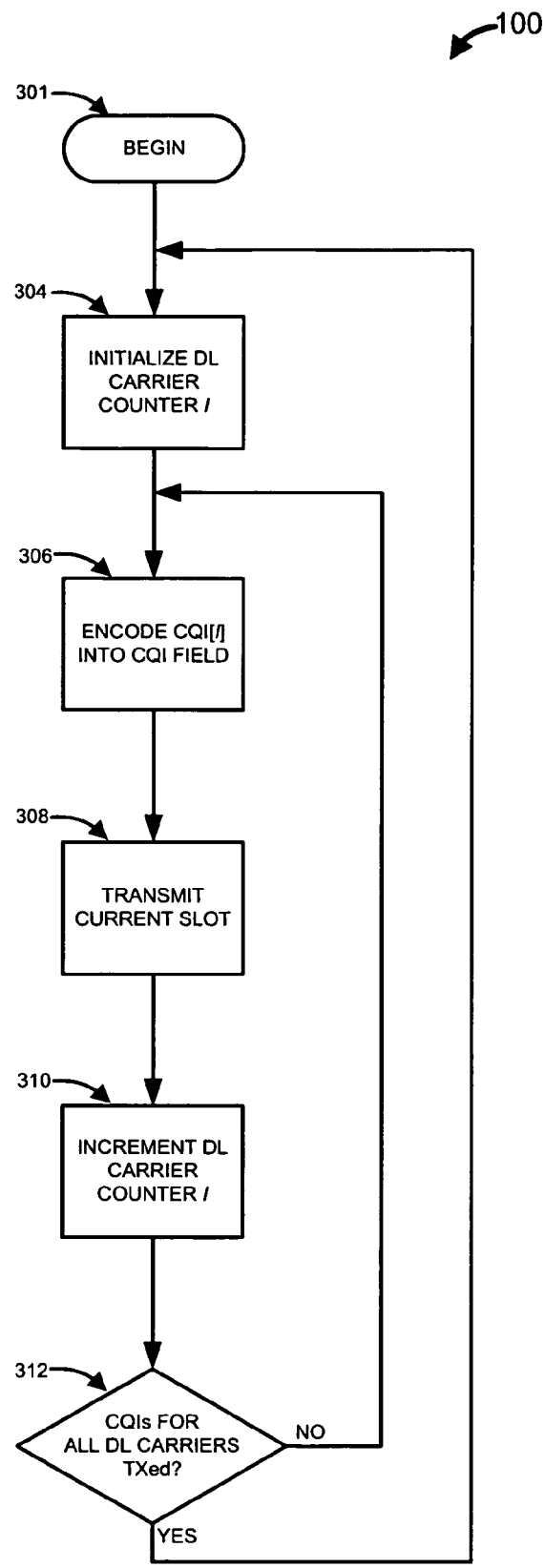
FIG. 3A illustrates selected steps and decision blocks of a process for transmitting Channel Quality Indicators of multiple downlink carriers via a single uplink carrier.

An exemplary process 300 using such method for N DL carriers and 1 UL carrier at a User Equipment device is illustrated in FIG. 3A. At flow point 301, the UE is ready to begin transmitting CQI data for the N downlink carriers on a single UL carrier. At step 304, the UE initializes I, which is a DL carrier counter for the UL carrier CQI. For example, I can be set equal to zero. At step 306, the UE encodes into the CQI field for a current time slot the value of CQI[I], which is the CQI for the Ith DL carrier. At step 308, the UE transmits during the current slot. At step 310, the UE increments the I counter. At decision block 312, the UE determines whether CQIs for each DL carrier have been transmitted during the current cycle. If I was set equal to zero in the step 304, for example, the UE may determine whether I=N. If CQIs for each DL carrier have not been transmitted during the current cycle (e.g., I<N), process flow returns to the step 306, and the above described steps are repeated for the then-current time slot, which is the next time slot.

When decision block 312 indicates that CQIs for each DL carrier have been transmitted during the current cycle (e.g., I=N), process flow returns to the step 304, and a new cycle begins, i.e., the UE initializes I once again, and the UE cycles through transmitting all the CQIs.

When multiple UL carriers are available (but still fewer than DL carriers), the CQIs for the DL carriers may be assigned for transmission to each of the UL carriers. For example, the N DL carriers may be assigned to M UL carriers so that each UL carrier carries CQI(s) for the same or nearly the same number of DL carriers. In a case of (M=2, N=4), for example, each UL carrier can carry CQIs for 2 DL carriers. In a case of (M=2, N=5), for example, one UL carrier can carry CQIs for 2 DL carriers, while the other UL carrier can carry CQIs for 3 DL carriers. The UE then performs a process such as the process 300 for each of the UL carriers, cycling through the CQIs of the DL carriers assigned to the UL carrier.

Figure 3B:
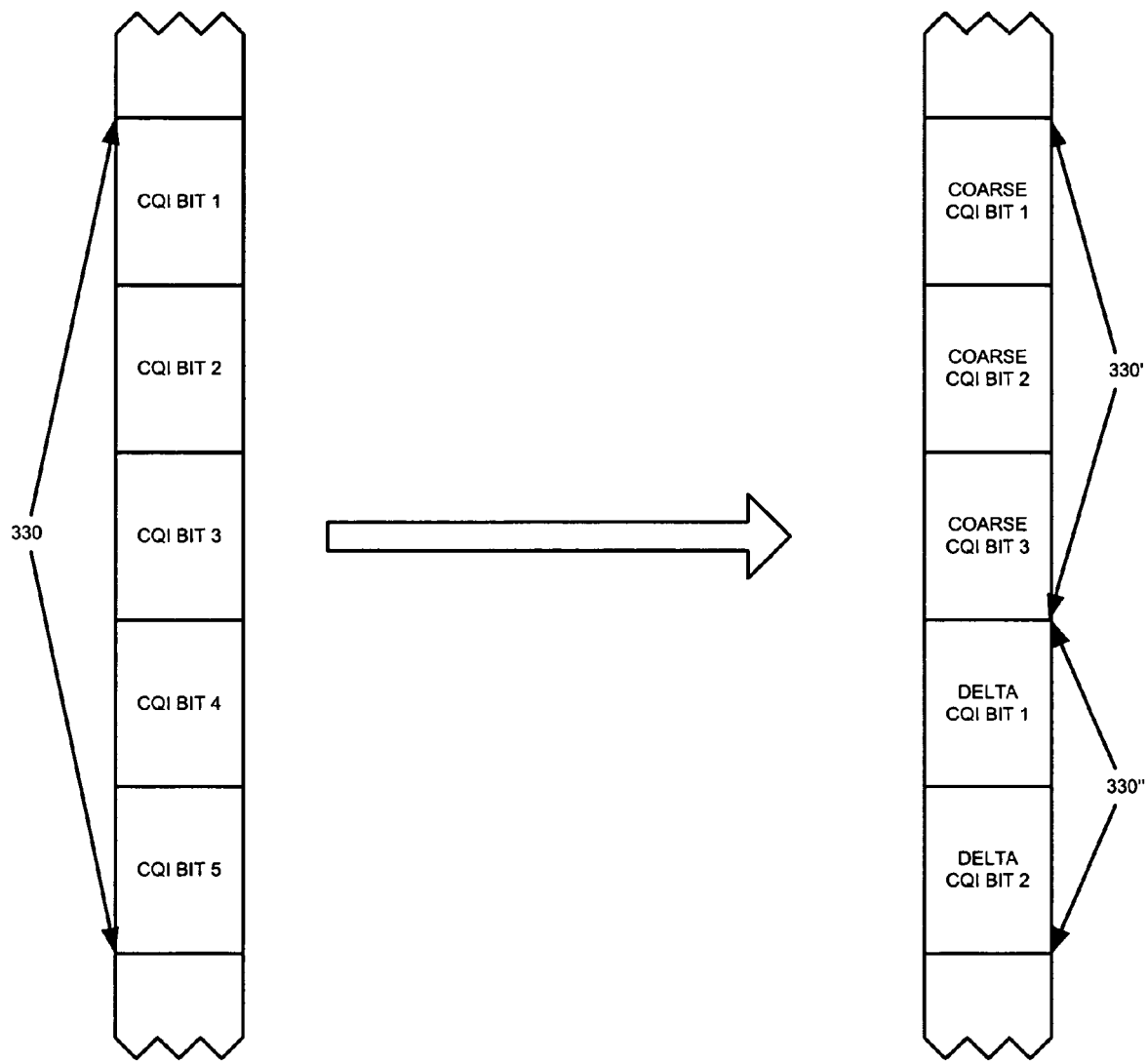
FIG. 3B illustrates division of a Channel Quality Indicator field into two subfields.

In still another variant, CQIs for multiple DL carriers are concurrently multiplexed into the CQI field of a single UL carrier. In accordance with the existing single-carrier specification, CQI is a five-bit field, providing essentially a 1 dB resolution over the range of interest. In embodiments, the resolution of the CQI transmitted by the UE may be reduced to a three-bit value, freeing additional two bits within the same CQI field. The freed bits can be used to send a delta update for the CQI of another DL carrier. Delta update indicates whether and by how much the CQI has increased or decreased. FIG. 3B illustrates this approach. In this Figure, the full five-bit CQI field 330 is transformed into a three-bit absolute coarse CQI subfield 330' for one carrier, and a delta update CQI subfield 330" for another carrier. As a person skilled in the art should understand after reading this disclosure, no particular order of the subfields 330' and 330" is required. Similarly, no particular order of the bits in these subfields is required.

In a case with (M=1, N=2), for example, a three-bit coarse absolute CQI for a first DL carrier can be encoded into a three bit subfield of the CQI field of the UL carrier during a first time slot. A delta update CQI for a second DL carrier can be encoded into the remaining two-bit filed portion of the CQI field in the same time slot. In the second (immediately following) time slot, a coarse absolute CQI for the second DL carrier can be encoded into the three-bit subfield, while a delta update CQI for the first DL carrier can be encoded into the remaining two-bit subfield. The process can then be repeated.

Of course, the CQI field may be split differently, for example, into a four-bit coarse absolute CQI subfield and a one-bit delta update CQI subfield. Furthermore, different orders of the subfields and of the bits within each subfield also fall within the scope of this description.

Figure 3C:
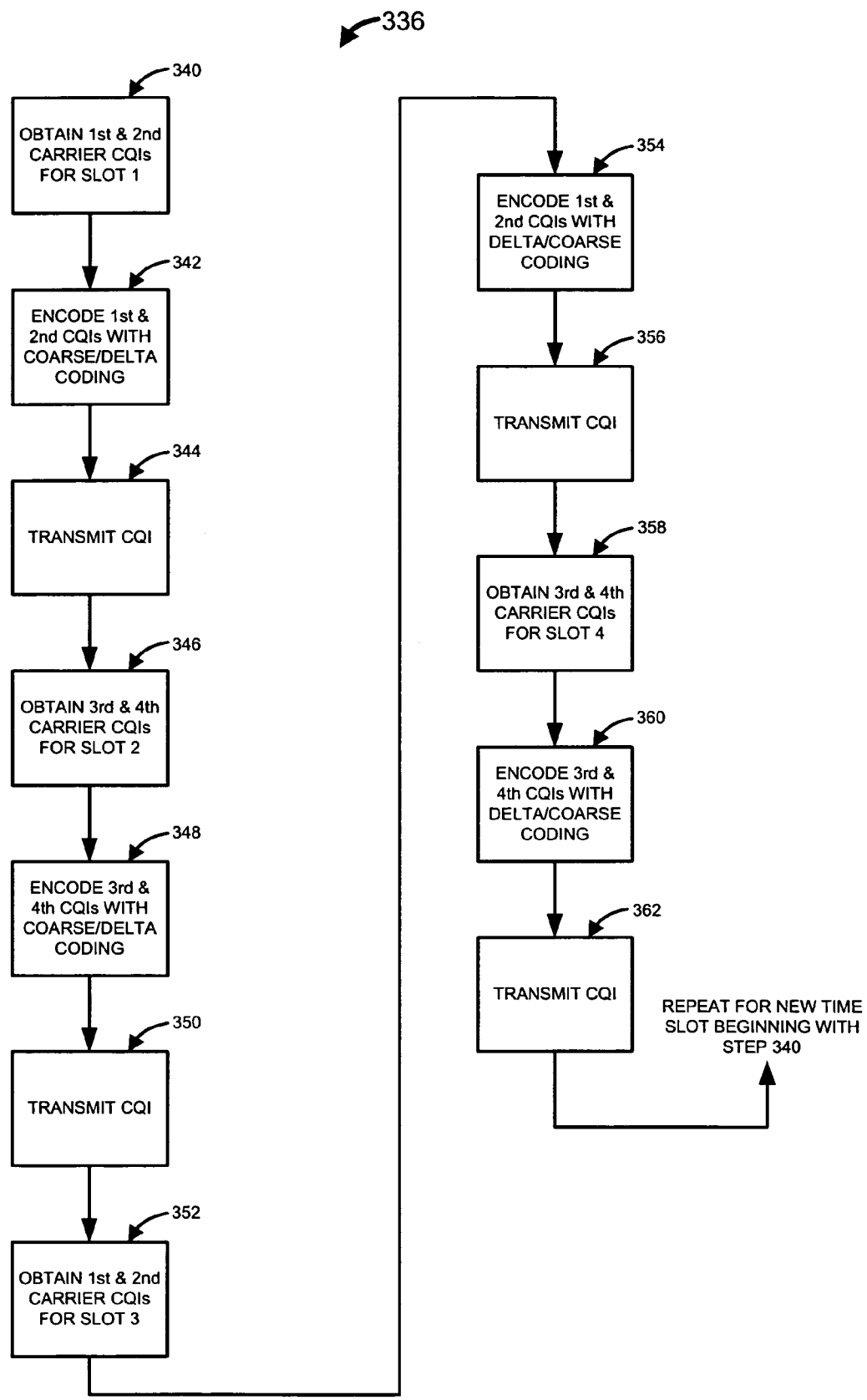
FIG. 3C illustrates selected steps and decision blocks of a joint coding process for transmitting Channel Quality Indicators of multiple downlink carriers via a single uplink carrier.

According to yet another variant, herein called "joint coding," cycling through all the CQIs with reduced frequency is combined with multiplexing CQIs for multiple DL carriers into the CQI field of a single UL carrier. In a (N=4, M=1) case, for example, the process may proceed as illustrated in FIG. 3C.

At step 340, CQIs corresponding to first and second DL carriers are obtained for transmission during a first time slot. At step 342, the CQI field in the UL carrier is encoded with a three-bit coarse absolute CQI for the first carrier and a two-bit delta update CQI for the second carrier. At step 344, the CQI field is transmitted on the UL carrier. At step 346, CQIs corresponding to third and fourth DL carriers are obtained for transmission during a second time slot, which immediately follows the first time slot. At step 348, the CQI field is encoded with a three-bit coarse absolute CQI for the third carrier and a two-bit delta update CQI for the fourth carrier. At step 350, the CQI field is transmitted on the UL carrier. At step 352, the CQIs corresponding to first and second DL carriers are obtained for transmission during a third time slot, which immediately follows the second time slot. At step 354, the CQI field is encoded with a three-bit coarse absolute CQI for the second carrier and a two-bit delta update CQI for the first carrier (note reversal of encoding of the first and second CQIs). At step 356, the CQI field is transmitted on the UL carrier. At step 358, the CQIs corresponding to the third and fourth DL carriers are obtained for transmission during a fourth time slot, which immediately follows the second time slot. At step 360, the CQI field is encoded with a three-bit coarse absolute CQI for the fourth carrier and a two-bit delta update CQI for the third carrier (again, note reversal of encoding of the third and fourth CQIs). At step 362, the CQI field is transmitted on the UL carrier.

The steps 340 through 362 are then repeated for the following time slots. In this way, the UE sends to the network CQIs for all four DL carriers in the CQI slot of the single UL carrier.

In one additional variant, one or more CQIs are encoded into FeedBack Information (FBI) bits of the UL DPCCH. The FBI bits can carry a coarse CQI, for example, a two-bit CQI. The FBI bits can also be encoded with a delta update CQI. It should also be understood that the FBI bits can be used to convey conventional five-bit CQI, albeit with a reduced frequency. For example, a five-bit CQI can be coded into and transmitted via FBI bits over multiple time slots.

In another embodiment, power control is implemented only for a subset of downlink carriers, for example, for a single downlink carrier. Downlink control is generally used for telephone (voice) transmissions, but may be omitted for data transmissions due to opportunistic scheduling. Because in many applications bandwidth needed for voice transmission is lower than bandwidth needed for downlink transmission of data, many or sometimes all voice channels may be transmitted on one downlink carrier. Consequently, some or all of the remaining downlink carriers within a cell may carry data payload. In this case, power control of these remaining downlink carriers may be omitted.

In each case, the transceiver may adjust (if needed) transmitted power of the downlink carrier associated with the received CQI in accordance with the received CQI. In other words, if the received CQI (whether absolute CQI or delta update CQI) indicates that the power should be increased, the processing component of the transceiver adjusts the transmitter so that the power is increased as indicated by the received CQI; if the received CQI indicates that the power should be decreased, the processing component of the transceiver adjusts the transmitter so that the power is decreased as indicated by the received CQI.

Recall that in the (N>M) case acknowledgement (ACK/NAK) messages for the (N−M) excess downlink carriers may also need to be transmitted on the uplink using the same M carriers that already convey ACK/NAK messages for the first M downlink carriers. As has already been mentioned, this may be achieved using additional code division multiplexed HS-DPCCHs, described above in relation to CQIs. The other methods described above and illustrated in FIGS. 3A, 3B, and 3C may also be used for the ACK/NAK messages, including reducing frequency of such messages for the downlink carriers (FIG. 3A), and reusing the FBI bits.

Figure 4A:
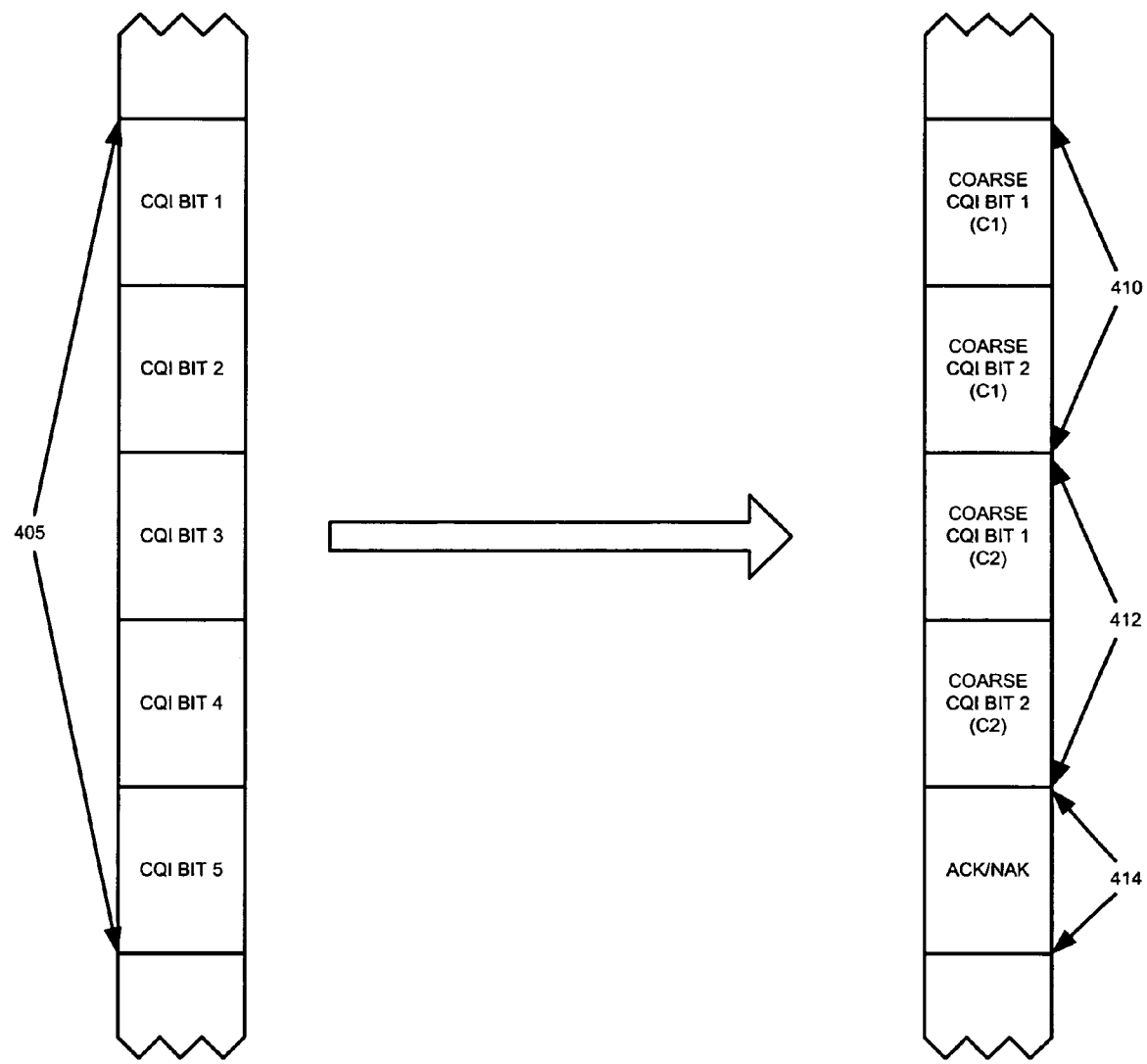
FIG. 4A illustrates division of a Channel Quality Indicator field into three subfields.

The ACK/NAK messages may also be multiplexed into the existing CQI field together with the coarse CQI and/or delta update CQI. FIG. 4A illustrates one example of such multiplexing. As is shown in this Figure, an existing CQI field 405 is broken into three subfields: (1) subfield 410 for a two-bit coarse absolute CQI of one carrier, (2) a two-bit coarse absolute CQI subfield 412 of another carrier, and (3) a one-bit subfield 414 for sending uplink ACK/NAK messages.

Figure 4B:
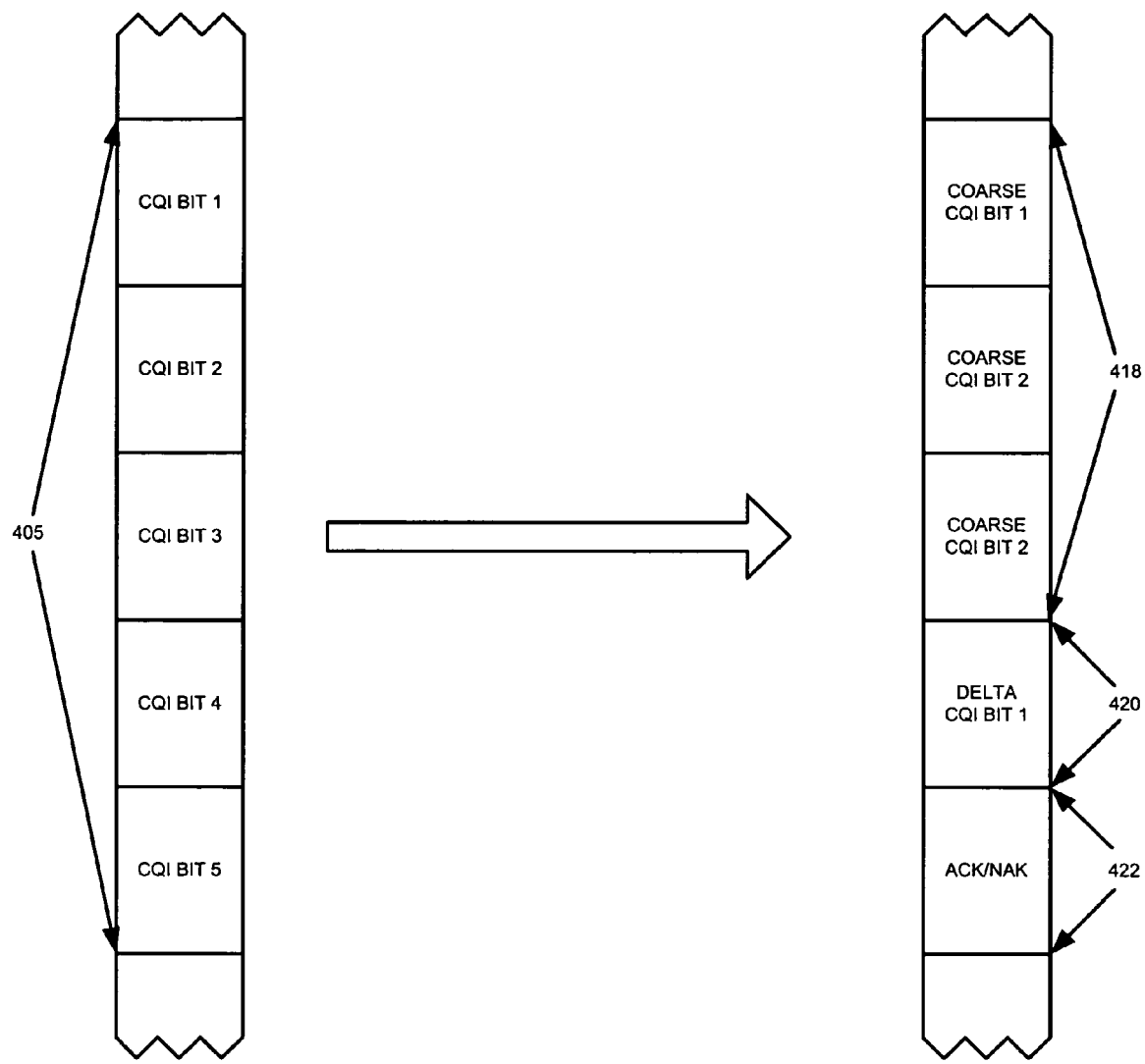
FIG. 4B illustrates another division of a Channel Quality Indicator field into three subfields.

Of course, the CQI field may be split in other ways. FIG. 4B illustrates splitting the CQI field 405 into a three-bit coarse absolute CQI subfield 418, a one-bit delta update CQI subfield 420, and a one-bit ACK/NACK subfield 422. Various orders of the subfields and various orders of bits within each subfield also fall within the scope of this specification.

The above methods may be combined. For example, additional code division multiplexed channels may be defined for the CQIs, while FBI bits may be reused for ACK/NAK.

Let us now turn to procedures for system acquisition. In one embodiment consistent with the invention, the procedure for cold acquisition of the system by a UE (e.g., by the UE 130) is the same as the cold acquisition procedure described in "Physical layer procedures (FDD)," 3GPP specification TS 25.214. In the multi-carrier context, however, only a subset of downlink carriers (the smallest subset being a single carrier out of a set of N carriers) need carry the P-SCH/S-SCH and the P-CCPCH to enable the UE to perform the three-step system acquisition procedure. Of course, the invention does not necessarily exclude the possibility of each of the downlink carriers containing the P-SCH/S-SCH and the P-CCPCH.

To facilitate warm acquisition, in one embodiment timing reference for the newly-added downlink carrier is the same as the timing reference of the anchor carrier on which the particular UE is camped in the same cell. In some variants, all the downlink carriers within a cell share the same timing reference. Synchronizing the different carriers from the same cell with the common timing reference allows omission of steps 1 and 2 in the system acquisition process described in the 3GPP specification TS 25.214 (related to the acquisition of the slot and frame timing, as well as the identification of the scrambling code group to which the cell belongs, through acquisition of P-SCH and identification of S-SCH). Synchronizing downlink carriers brings this simplification at little or no cost to the system.

If only some but not all downlink carriers share a common timing reference, a signaling message can be used to indicate to the UE (for which the new carrier is being added) whether or not the new carrier shares the timing reference with the anchor carrier. If the new carrier has a known time offset from the anchor carrier, a signaling message can be used to signal to the UE the magnitude of the time offset, also simplifying the warm acquisition procedure. Such signaling may be performed using, for example, P-CCPCH and/or S-CCPCH.

Furthermore, using the same scrambling code for all the downlink carriers within a cell enable omission of step 3 from the acquisition procedure. Using a common scrambling code within a cell has an additional advantage of allowing sharing of a single descrambler for demodulation of multiple or even all downlink carriers. Consequently, in certain embodiments all or a plurality of selected downlink carriers within a cell share a common scrambling code.

If the scrambling code of the new carrier differs from the scrambling code of the current anchor carrier, the radio network can signal the UE which scrambling code is being used on the new carrier. Such signaling may be performed using, for example, P-CCPCH and/or S-CCPCH.

Figure 5:
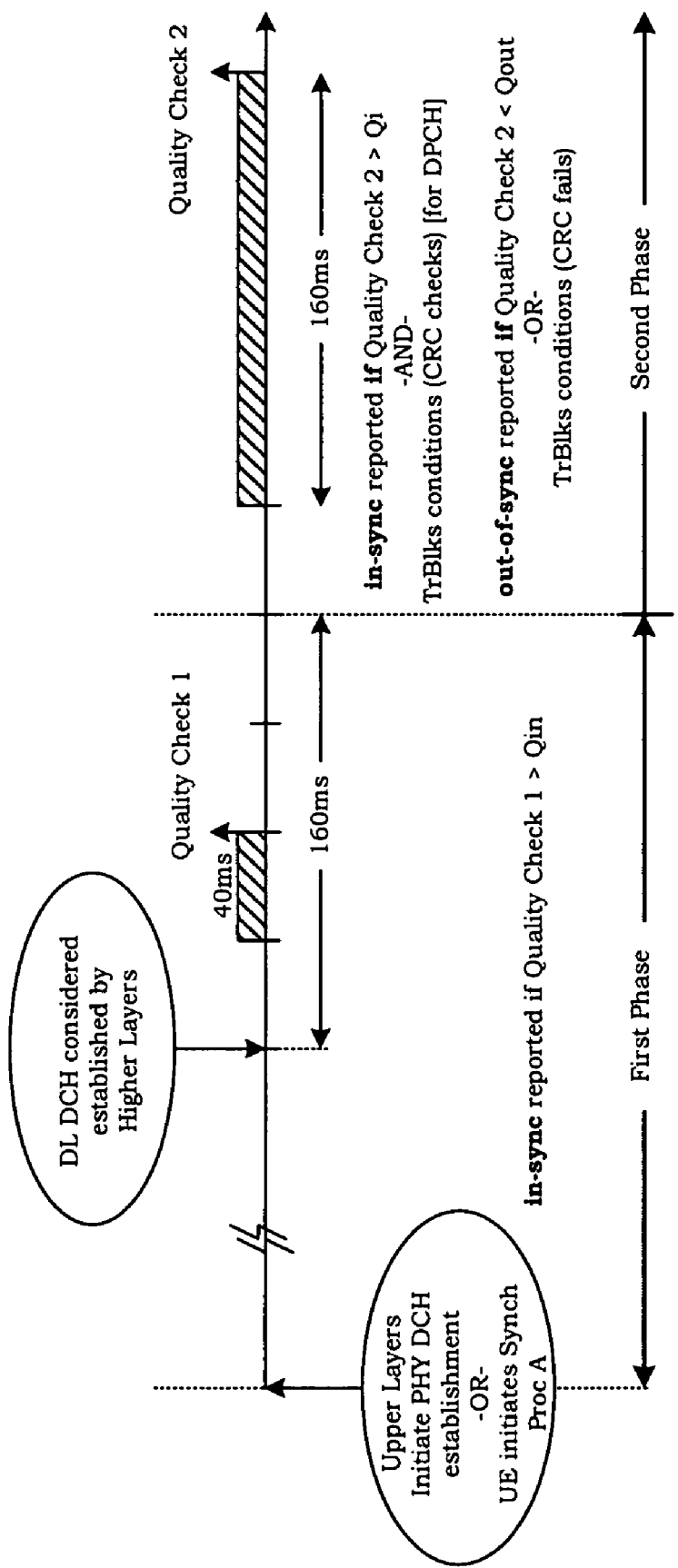
FIG. 5 illustrates phases of synchronization of downlink dedicated channels.

The 3GPP specification TS 25.214 defines two phases for the Synchronization of DL Dedicated Channels: First Phase and Second Phase. These phases are illustrated in FIG. 5. TS 25.214 further defines two synchronization procedures for Dedicated Channels, namely Procedure A and Procedure B. Procedure A is the establishment procedure, as well as the "break and make" reconfigurations procedure (e.g., hard handoff to another frequency, and inter-RAT handoff). Procedure B is the procedure for radio link addition/reconfiguration (e.g., adding more cells into a UE's active set).

Because synchronization Procedure B does not directly involve the UE, it does not require changes to support multi-carrier operation. Procedure A, however, may be modified for multi-carrier operation. For example, step "b" of Procedure A specifies that the initial transmit power for the DL DPCCH or F-DPCH is set by higher layers in single-carrier operation. In some embodiments capable of multi-carrier operation, the initial transmit power is set to be the same as the current transmit power for one of the established carriers, thereby simplifying synchronization.

In some multi-carrier embodiments, the downlink chip and frame synchronization described in step "c" is simplified by common timing of the different downlink carriers within the cell.

Step "d" of Procedure A specifies initial UE transmission. For single-carrier systems, transmission of DPCCH start at an initial transmit power, which is set by higher communication protocol layers. In certain multi-carrier embodiments, this initial DPCCH power may also be set to the same level as the power level of a DPCCH of another active uplink carrier. The power control preamble may thus shortened to speed up the synchronization procedure.

The random access procedure for a multi-carrier system may be the same or substantially the same as that for a single carrier system, because the initial system access is performed on a single carrier and the addition of carriers is considered to be a dedicated channel establishment or reconfiguration.

In certain strict multi-carrier system embodiments, PHY HARQ retransmissions of HS-PDSCH data are made on a carrier other than the carrier on which the original transmission was made.

In certain multi-cell system embodiments, PHY HARQ retransmissions of E-DPCH data are made only on carriers for which the cell is the serving cell of the UE.

Figure 6:
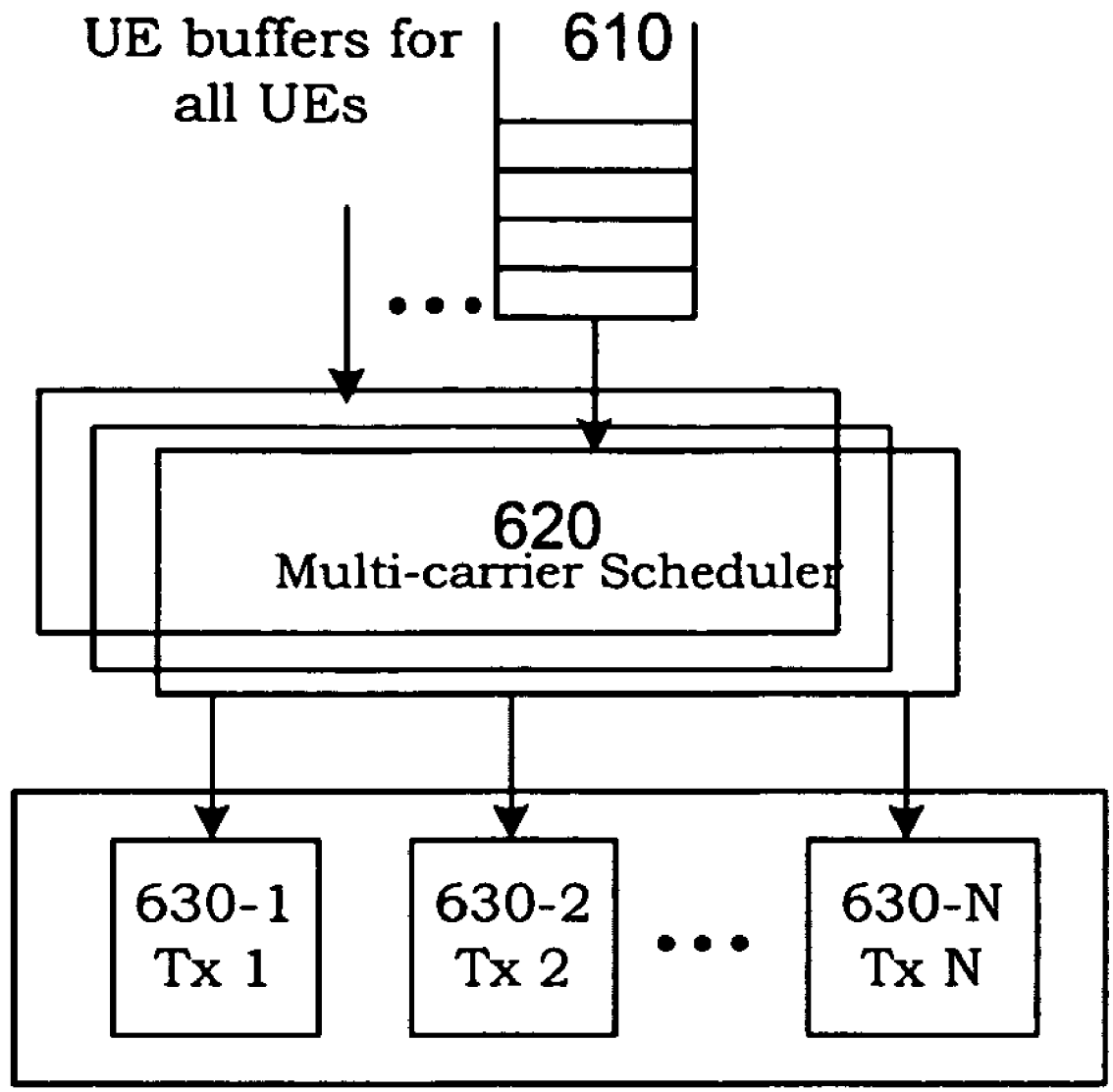
FIG. 6 illustrates joint carrier scheduling of payload data for downlink transmission.

In multi-carrier system embodiments, downlink carrier scheduling may be performed in different ways. FIG. 6 illustrates joint carrier scheduling. In this embodiment, downlink payload data in each UE buffer, such as the UE buffer 610, is scheduled by a corresponding multi-carrier scheduler, such as a multi-carrier common scheduler 620. The scheduler 620, located at the controller (e.g., the controller 110 of FIG. 1), schedules the data for all the downlink carrier transmitters (630-1 through 630-N) in the active set of the particular UE device. The scheduler 620 may perform scheduling either on all available downlink carriers, or only on a subset of the available downlink carriers. Advantageously, the scheduler 620 may schedule downlink transmissions by considering channel quality and available bandwidth of each of the carriers jointly. For example, when signal fading restricts or delays downlink transmissions on one of the carriers, the scheduler 620 may reduce or even eliminate the UE data scheduled for transmission on that carrier, and increase scheduled data throughput on other carriers that are not experiencing fading at the same time.

Figure 7:
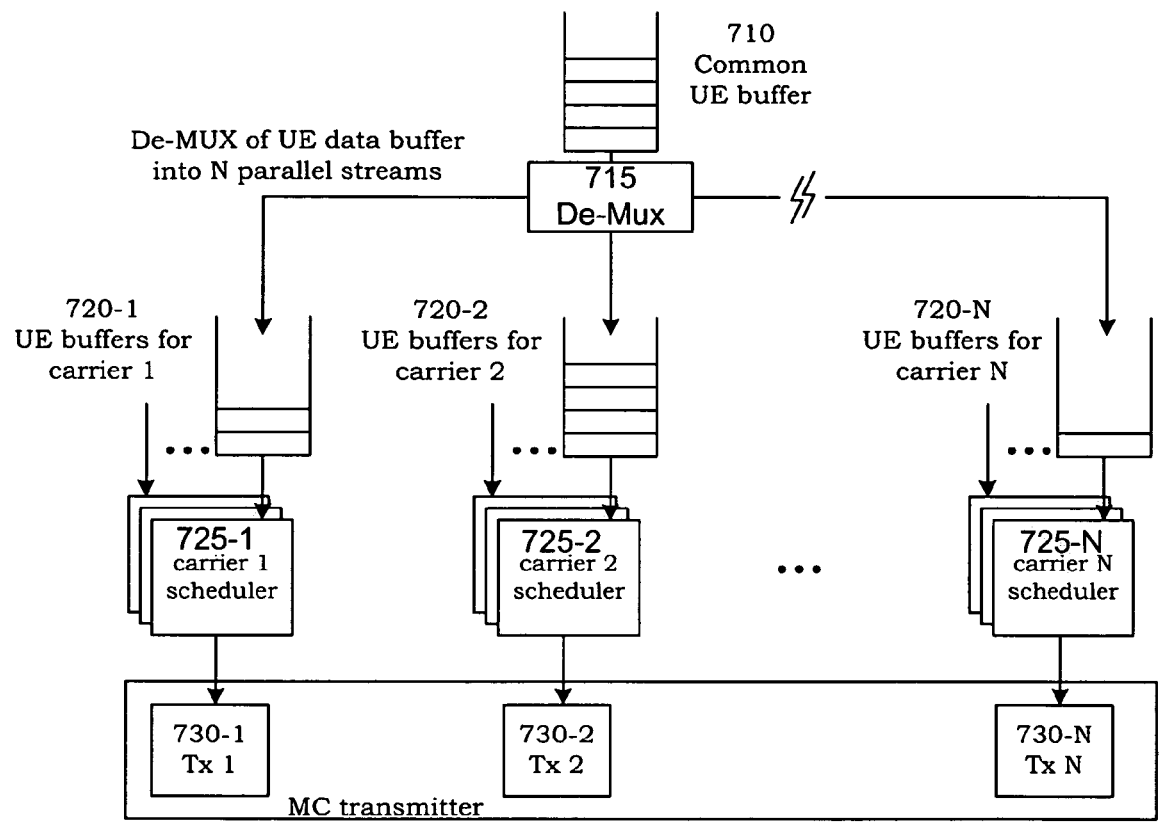
FIG. 7 illustrates independent carrier scheduling of payload data for downlink transmission.

FIG. 7 illustrates independent (or individual) downlink carrier scheduling. In this embodiment, the data in a common UE data buffer 710 is split into N parallel streams by a De-Mux 715. The streams may be of the same size or of different sizes, depending, for example, on the bandwidth of each of the carriers and on other parameters. In the strict multi-carrier operation, splitting may take place in the controller (e.g., the controller 110 of FIG. 1) or in the Node-B (e.g., in the site 125). In the multi-cell operation, splitting may take place in the controller.

Each of the individual streams is fed into an individual carrier buffer corresponding to the stream's carrier. The individual carrier buffers are designated with reference numerals 720-1 through 720-N. The data in each individual carrier buffer is then scheduled for downlink transmission by a corresponding carrier scheduler. The carrier schedulers, which are designated by reference numerals 725-1 through 725-N, may be located at the Node-B, such as the site 125. The data from each of the carrier buffers 720 is then transmitted on its carrier by a corresponding downlink carrier transmitter. The downlink carrier transmitters are designated with reference numerals 730-1 through 730-N.

It should be understood that the notions of joint and independent carrier scheduling exist on top of the notions of strict multi-carrier and multi-cell operation modes.

Strict multi-carrier operational characteristics include these:
1. One cell is serving HS-DSCH and E-DCH for all carriers supported by a given UE.
2. User data buffer multi-carrier split is performed at Node-B.
3. Node-B can do individual carrier scheduling or joint carrier scheduling.
4. HARQ PHY re-transmissions can use the same or a different carrier.

Figure 8:
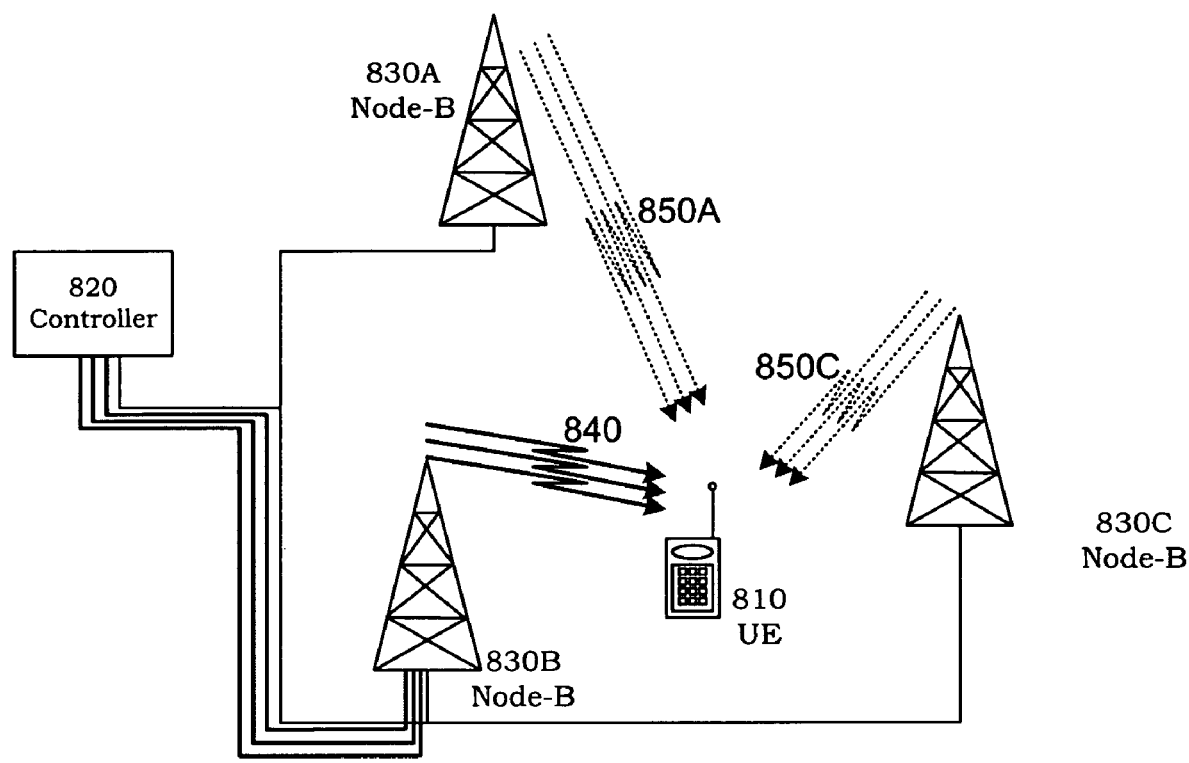
FIG. 8 illustrates the concept of strict multi-carrier operation.

FIG. 8 further illustrates the concept of strict multi-carrier operation. Here, a User Equipment device 810 is shown during soft handoff. A radio network controller 820 controls operation of three Node-B sites: Node-B site 830A, Node-B site 830B, and Node-B site 830C. Solid lines 840 designate multi-carrier data transmissions from the site 830B, while dashed lines 850A and 850C designate overhead transmissions from the sites 830A and 830C, respectively. The overhead transmissions may carry control information, for example, uplink power control, E-HICH, and E-RGCH. In this way, multiple sites have the ability to command the UE 810 to power down, for example, in order to reduce interference in their associated sectors.

Multi-cell operational characteristics include the following:

Different cells may be the serving HS-DSCH and E-DCH for different carriers supported by a given UE.

User data buffer multi-carrier split is performed at a radio network controller; if the Node-B contains more than one serving cell for a given UE, additional split may be performed at the Node-B.

A Node-B can schedule a given UE within the set of carriers for which the Node-B contains the UE's serving cell; if this set is greater than one, individual or joint carrier scheduling may be performed.

Figure 9:
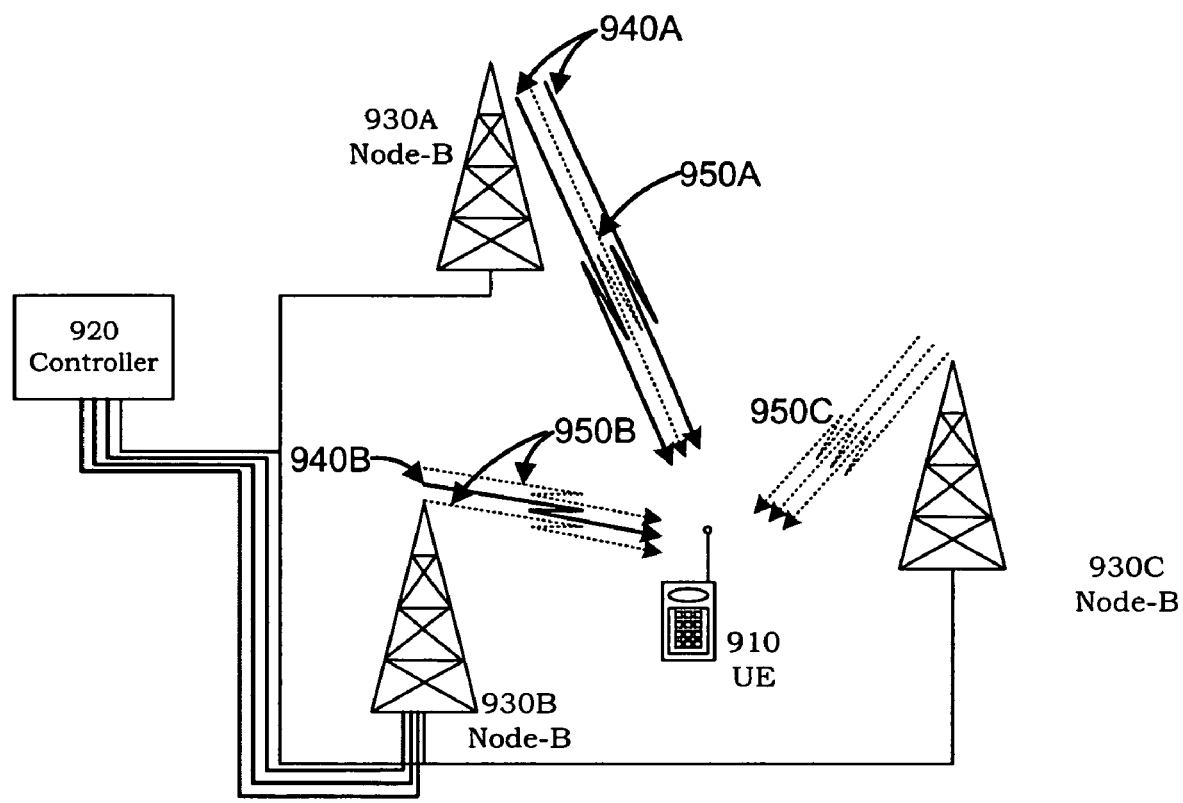
FIG. 9 illustrates the concept of multi-cell operation.

FIG. 9 further illustrates the concept of multi-cell operation. In this Figure, a User Equipment device 910 is also shown during soft handoff. A radio network controller 920 controls operation of three Node-B sites: Node-B site 930A, Node-B site 930B, and Node-B site 930C. Solid lines 940 designate downlink data transmissions, while dashed lines 950 designate overhead transmissions. Note that in the multi-cell operational mode illustrated in FIG. 9, downlink data is served from both site 930A and 930B: solid lines 940A designate data transmissions on two carriers from the site 930A, and solid line 940B designates data transmissions on a different carrier from the site 930B. The downlink overhead transmissions, which are designated with dashed lines 950, are sent from all three sites 930. The overhead transmissions may carry, for example, control information, uplink power control, E-HICH, and E-RGCH.

Although steps and decisions of various methods have been described serially in this disclosure, some of these steps and decisions may be performed by separate elements in conjunction or in parallel, asynchronously or synchronously, in a pipelined manner, or otherwise. There is no particular requirement that the steps and decisions be performed in the same order in which this description lists them, except where explicitly so indicated, otherwise made clear from the context, or inherently required. Furthermore, not every illustrated step and decision is required in every embodiment in accordance with the invention, while some steps that have not been specifically illustrated may be desirable or necessary in some embodiments in accordance with the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To show clearly this interchangeability of hardware and software, various illustrative components, blocks, modules, circuits, and steps have been described above generally in terms of their functionality. Whether such functionality is implemented as hardware, software, or combination of hardware and software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user equipment device. Alternatively, the processor and the storage medium may reside as discrete components in a user equipment device.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

What is claimed is:

1. A wireless user equipment device for communicating with a base transceiver station of a radio network, the wireless user equipment device comprising:
   a receiver configured to receive from the base transceiver station data on a first downlink carrier and on a second downlink carrier, to determine values of a first channel quality indicator for the first downlink carrier, and to determine values of a second channel quality indicator for the second downlink carrier, one value of the first channel quality indicator per time slot, one value of the second channel quality indicator per time slot;
   a transmitter configured to transmit on a first uplink carrier to the base transceiver station channel quality indicator values in a CQI field, one CQI field per time slot; and
   a processing circuit coupled to the receiver and to the transmitter, the processing circuit being configured to encode the CQI field for each time slot of a first plurality of time slots with (1) a value derived from the value of the first channel quality indicator corresponding to said each time slot of the first plurality of time slots, and (2) a value derived from the value of the second channel quality indicator corresponding to said each time slot of the first plurality of time slots, so that the CQI field transmitted on the first uplink carrier conveys information regarding channel quality of the first downlink carrier and information regarding channel quality of the second downlink carrier for said each time slot of the first plurality of time slots, wherein the CQI field includes both the first channel quality indicator and the second channel quality indicator for the first downlink carrier and the second downlink carrier in a single time slot.

2. The wireless user equipment device of claim 1, the processing circuit being further configured to obtain the value derived from the value of the first channel quality indicator corresponding to said each time slot of the first plurality of time slots by reducing resolution of the value of the first channel quality indicator corresponding to said each time slot of the first plurality of time slots.

3. The wireless user equipment device of claim 2, the processing circuit being further configured to obtain the value derived from the value of the second channel quality indicator corresponding to said each time slot of the first plurality of time slots by computing a difference between (1) the value of the second channel quality indicator corresponding to said each time slot of the first plurality of time slots, and (2) the value of the second channel quality indicator corresponding to a time slot immediately preceding said each time slot of the first plurality of time slots.

4. The wireless user equipment device of claim 3, wherein:
   the processing circuit is further configured to encode the CQI field for each time slot of a second plurality of time slots with a value derived from the value of the first channel quality indicator corresponding to said each time slot of the second plurality of time slots, and a value derived from the value of the second channel quality indicator corresponding to said each time slot of the second plurality of time slots; and
   time slots of the first plurality of time slots do not belong to the second plurality of time slots, and time slots of the second plurality of time slots do not belong to the first plurality of time slots.

5. The wireless user equipment device of claim 4, wherein the time slots of the first and second pluralities of time slots are interleaved.

6. The wireless user equipment device of claim 4, wherein the CQI field is five bits in length, the value derived from the value of the first channel quality indicator corresponding to said each time slot of the first plurality of time slots is three bits in length, and the value derived from the value of the second channel quality indicator corresponding to said each time slot of the first plurality of time slots is two bits in length.

7. The wireless user equipment device of claim 3, the processing circuit being further configured to encode the CQI field for said each time slot of the first plurality of time slots with an ACK/NAK acknowledgment value that corresponds to payload data received by the wireless user device from the base transceiver station on a downlink carrier.

8. The wireless user equipment device of claim 7, wherein the CQI field is five bits in length, the value derived from the value of the first channel quality indicator corresponding to said each time slot of the first plurality of time slots is three bits in length, the value derived from the value of the second channel quality indicator corresponding to said each time slot of the first plurality of time slots is one bit in length, and the ACK/NAK acknowledgement value is one bit in length.

9. The wireless user equipment device of claim 2, the processing circuit being further configured to obtain the value derived from the value of the second channel quality indicator corresponding to said each time slot of the first plurality of time slots by reducing resolution of the value of the second channel quality indicator corresponding to said each time slot of the first plurality of time slots; and
    encode the CQI field for said each time slot of the first plurality of time slots with an ACK/NAK acknowledgment value that corresponds to payload data received by the wireless user device from the base transceiver station on a downlink carrier.

10. The wireless user equipment device of claim 9, wherein the CQI field is five bits in length, the value derived from the value of the first channel quality indicator corresponding to said each time slot of the first plurality of time slots is two bits in length, the value derived from the value of the second channel quality indicator corresponding to said each time slot of the first plurality of time slots is two bits in length, and the ACK/NAK acknowledgement value is one bit in length.

11. A wireless user equipment device for communicating with a base transceiver station of a radio network, the wireless user equipment device comprising:
    a receiver configured to receive from the base transceiver station data on a plurality of downlink carriers, and to determine values of a channel quality indicator for each downlink carrier of the plurality of downlink carriers;
    a transmitter configured to transmit on a first uplink carrier to the base transceiver station channel quality indicator values in a CQI field, one CQI field per time slot; and
    a processing circuit coupled to the receiver and to the transmitter, the processing circuit being configured to
        select for each time slot a selected downlink carrier from the plurality of downlink carriers, each downlink carrier of the plurality of downlink carriers being selected once in a cycle period, and
        encode the CQI field with the channel quality indicator of the selected downlink carrier for said each time slot, wherein the CQI field includes the values of the channel quality indicators for each downlink carrier of the plurality of downlink carriers in a single time slot.

12. The wireless user equipment device of claim 11, wherein the cycle period corresponds to the number of time slots equal to the number of downlink carriers in the plurality of downlink carriers.

13. A wireless user equipment device for communicating with a base transceiver station of a radio network, the wireless user equipment device comprising:
    a receiver configured to receive from the base transceiver station data on a plurality of downlink carriers, and to determine values of a channel quality indicator for each downlink carrier of the plurality of downlink carriers;
    a transmitter configured to transmit on a first uplink carrier to the radio network data in a FeedBack Indicator (FBI) field, one FBI field per time slot; and
    a processing circuit coupled to the receiver and to the transmitter, the processing circuit being configured to encode the FBI field with at least a portion of a value of a channel quality indicator of a first downlink carrier selected from the plurality of downlink carriers, wherein the CQI field includes the values of the channel quality indicators for each downlink carrier of the plurality of downlink carriers in a single time slot.

14. The wireless user equipment device of claim 13, wherein:
    the transmitter is further configured to transmit on the first uplink carrier to the base transceiver station network data in a CQI field, one CQI field per time slot; and
    the processing circuit is further configured to encode the CQI field with a value of a channel quality indicator of a second downlink carrier selected from the plurality of downlink carriers.

15. A base transceiver station in a radio network, for communicating with a wireless user equipment device, the base transceiver station comprising:
    a receiver configured to receive data from the wireless user equipment device on a first uplink carrier, the first uplink carrier including a channel with a CQI field;
    a transmitter configured to transmit data to the wireless user equipment device on a first downlink carrier and on a second downlink carrier; and
    a processor coupled to the receiver and to the transmitter, wherein the processor is configured to:
        receive values in the CQI field, one received value in the CQI field per time slot,
        adjust output power of the first downlink carrier in accordance with a first subfield of the received value in the CQI field in each time slot, and
        adjust output power of the second downlink carrier in accordance with a second subfield of the received value in the CQI field in said each time slot, wherein the CQI field includes both the first channel quality indicator and the second channel quality indicator for the first downlink carrier and the second downlink carrier in a single time slot.

16. The base transceiver station of claim 15, the processor being further configured to:
    read a third subfield of the received value in the CQI field, and
    if the third subfield has a first value, inform a radio network controller of the radio network that at least one packet sent on a downlink carrier to the wireless user equipment device has been successfully received by the wireless user equipment device.

17. The base transceiver station of claim 15, wherein:
    the first uplink carrier includes a channel with a FeedBack Information (FBI) field;
    the processor is further configured to inform a radio network controller of the radio network that at least one packet sent on a downlink carrier to the wireless user equipment device has been successfully received by the wireless user equipment device, if a third subfield of the FBI field has a first predetermined value.

18. A method of operating a wireless user equipment device for communicating with a base transceiver station of a radio network, the method comprising:
    receiving from the base transceiver station data on a first downlink carrier and on a second downlink carrier;
    determining values of a first channel quality indicator for the first downlink carrier, one value of the first channel quality indicator per time slot;
    determining values of a second channel quality indicator for the second downlink carrier, one value of the second channel quality indicator per time slot;
    transmitting on a first uplink carrier to the radio network channel quality indicator values in a CQI field, one CQI field per time slot; and encoding the CQI field for each time slot of a first plurality of time slots with a value derived from the value of the first channel quality indicator corresponding to said each time slot of the first plurality of time slots, and a value derived from the value of the second channel quality indicator corresponding to said each time slot of the first plurality of time slots, wherein the CQI field includes both the first channel quality indicator and the second channel quality indicator for the first downlink carrier and the second downlink carrier in a single time slot.

19. The method of claim 18, further comprising:
obtaining the value derived from the value of the first channel quality indicator corresponding to said each time slot of the first plurality of time slots by reducing resolution of the value of the first channel quality indicator corresponding to said each time slot of the first plurality of time slots.

20. The method of claim 19, further comprising:
obtaining the value derived from the value of the second channel quality indicator corresponding to said each time slot of the first plurality of time slots by computing a difference between (1) the value of the second channel quality indicator corresponding to said each time slot of the first plurality of time slots, and (2) the value of the second channel quality indicator corresponding to a time slot immediately preceding said each time slot of the plurality of time slots.

21. The method of claim 20, further comprising:
encoding the CQI field for each time slot of a second plurality of time slots with a value derived from the value of the first channel quality indicator corresponding to said each time slot of the second plurality of time slots, and a value derived from the value of the second channel quality indicator corresponding to said each time slot of the second plurality of time slots;
wherein time slots of the first plurality of time slots do not belong to the second plurality of time slots, and time slots of the second plurality of time slots do not belong to the first plurality of time slots.

22. The method of claim 21, wherein the time slots of the first and second pluralities of time slots are interleaved.

23. The method of claim 21, wherein the CQI field is five bits in length, the value derived from the value of the first channel quality indicator corresponding to said each time slot of the first plurality of time slots is three bits in length, and the value derived from the value of the second channel quality indicator corresponding to said each time slot of the first plurality of time slots is two bits in length.

24. The method of claim 20, further comprising:
encoding the CQI field for each time slot of the first plurality of time slots with an ACK/NAK acknowledgment value that corresponds to payload data received by the wireless user device from the radio network on a downlink carrier.

25. The method of claim 24, wherein the CQI field is five bits in length, the value derived from the value of the first channel quality indicator corresponding to said each time slot of the first plurality of time slots is three bits in length, the value derived from the value of the second channel quality indicator corresponding to said each time slot of the first plurality of time slots is one bit in length, and the ACK/NAK acknowledgement value is one bit in length.

26. The method of claim 19, further comprising:
obtaining the value derived from the value of the second channel quality indicator corresponding to said each time slot of the first plurality of time slots by reducing resolution of the value of the second channel quality indicator corresponding to said each time slot of the first plurality of time slots; and
encoding the CQI field for each time slot of the first plurality of time slots with an ACK/NAK acknowledgment value that corresponds to payload data received by the wireless user device from the radio network on a downlink carrier.

27. The method of claim 26, wherein the CQI field is five bits in length, the value derived from the value of the first channel quality indicator corresponding to said each time slot of the first plurality of time slots is two bits in length, the value derived from the value of the second channel quality indicator corresponding to said each time slot of the first plurality of time slots is two bits in length, and the ACK/NAK acknowledgement value is one bit in length.

28. A method of operating a wireless user equipment device for communicating with a base transceiver station of a radio network, the method comprising:
receiving from the base transceiver station data on a plurality of downlink carriers;
determining values of a channel quality indicator for each downlink carrier of the plurality of downlink carriers;
transmitting on a first uplink carrier to the radio network channel quality indicator values in a CQI field, one CQI field per time slot;
selecting for each time slot a selected downlink carrier from the plurality of downlink carriers, each downlink carrier of the plurality of downlink carriers being selected once in a cycle period; and
encoding the CQI field with the channel quality indicator of the selected downlink carrier for said each time slot, so that the CQI field transmitted on the first uplink carrier conveys information regarding channel quality of said each downlink carrier once within the cycle period, wherein the CQI field includes the values of the channel quality indicators for each downlink carrier of the plurality of downlink carriers in a single time slot.

29. The method of claim 28, wherein the cycle period corresponds to the number of time slots equal to the number of downlink carriers in the plurality of downlink carriers.

30. A method of operating a wireless user equipment device for communicating with a base transceiver station of a radio network, the method comprising:
receiving from the base transceiver station data on a plurality of downlink carriers;
determining values of a channel quality indicator for each downlink carrier of the plurality of downlink carriers;
transmitting on a first uplink carrier to the radio network data in a FeedBack Indicator (FBI) field, one FBI field per time slot; and
encoding the FBI field with at least a portion of a value of a channel quality indicator of a first downlink carrier selected from the plurality of downlink carriers, wherein the CQI field includes the values of the channel quality indicators for each downlink carrier of the plurality of downlink carriers in a single time slot.

31. The method of claim 30, further comprising:
transmitting on the first uplink carrier to the base transceiver station data in a CQI field, one CQI field per time slot;
encoding the CQI field with a value of a channel quality indicator of a second downlink carrier selected from the plurality of downlink carriers.

32. A method of operating a base transceiver station in a radio network, the method comprising:
  receiving data from a wireless user equipment device on a first uplink carrier, the first uplink carrier including a channel with a CQI field;
  transmitting data to the wireless user equipment device on a first downlink carrier and on a second downlink carrier;
  reading values received in the CQI field, one value received in the CQI field per time slot;
  adjusting output power of the first downlink carrier in accordance with a first subfield of the value received in the CQI field in each time slot; and
  adjusting output power of the second downlink carrier in accordance with a second subfield of the value received in the CQI field in said each time slot, wherein the CQI field includes both a first channel quality indicator and a second channel quality indicator for the first downlink carrier and the second downlink carrier in a single time slot.

33. The method of claim 32, further comprising:
  if a third subfield of the value received in the CQI field has a first predetermined value, informing a radio network controller of the radio network that at least one packet sent on a downlink carrier to the wireless user equipment device has been successfully received by the wireless user equipment device.

34. The method of claim 32, further comprising:
  if a predetermined subfield of a FeedBack Information (FBI) field of a channel of the first uplink carrier has a first predetermined value, informing a radio network controller of the radio network that at least one packet sent on a downlink carrier to the wireless user equipment device has been successfully received by the wireless user equipment device.

35. A method of operating a base transceiver station in a radio network, the method comprising:
  transmitting at least one downlink anchor carrier with full 3GPP Release 99 capability; and
  transmitting at least one downlink non-anchor carrier with partial 3GPP Release 99 capability, the step of transmitting at least one downlink non-anchor carrier overlapping in time with the step of transmitting at least one downlink anchor carrier.

36. The method of claim 35, wherein the at least one downlink non-anchor carrier does not carry a synchronization timing channel (SCH).

37. The method of claim 35, wherein the at least one downlink non-anchor carrier does not carry a Primary Common Control Physical channel (P-CCPCH).

38. The method of claim 35, wherein the at least one downlink non-anchor carrier does not carry a Secondary Common Control Physical channel (S-CCPCH).

39. The method of claim 35, wherein the at least one downlink non-anchor carrier does not carry a Physical Random Access Channel (PRACH).

40. The method of claim 35, wherein the at least one downlink non-anchor carrier does not carry a paging channel.

41. The method of claim 35, wherein the base transceiver station does not transmit downlink anchor carriers in addition to the at least one downlink anchor carrier, and the at least one downlink anchor carrier consists of a single downlink anchor carrier.

42. The method of claim 35, further comprising:
  synchronizing all downlink carriers transmitted by the base transceiver station to a single time reference.

43. The method of claim 35, further comprising:
  synchronizing to a single time reference all downlink carriers transmitted by all base transceiver stations of site of the base transceiver station.

44. A method of operating a base transceiver station in a radio network, the method comprising:
  transmitting at least one downlink anchor carrier with a first common channel; and
  transmitting at least one downlink non-anchor carrier that does not carry the first common channel, the step of transmitting at least one downlink non-anchor carrier overlapping in time with the step of transmitting at least one downlink anchor carrier.

45. The method of claim 44, wherein the first common channel is a synchronization timing channel (SCH).

46. The method of claim 44, wherein the first common channel is a Primary Common Control Physical channel (P-CCPCH).

47. The method of claim 44, wherein the first common channel is a Secondary Common Control Physical channel (S-CCPCH).

48. The method of claim 44, wherein the first common channel is a Physical Random Access Channel (PRACH).

49. The method of claim 44, wherein the first common channel is a paging channel.

50. A base transceiver station in a radio network, the base transceiver station comprising:
  a receiver for receiving data from user equipment devices on at least one uplink carrier; and
  a transmitter for transmitting data to user equipment devices on a plurality of downlink carriers, the transmitter being configured to transmit at least one downlink anchor carrier with full 3GPP Release 99 capability, and transmit at least one downlink non-anchor carrier with partial 3GPP Release 99 capability, transmissions of the at least one downlink anchor carrier overlapping in time with transmissions of the at least one downlink non-anchor carrier.

51. The base transceiver station of claim 50, wherein the at least one downlink non-anchor carrier does not carry a synchronization timing channel (SCH).

52. The base transceiver station of claim 50, wherein the at least one downlink non-anchor carrier does not carry a Primary Common Control Physical channel (P-CCPCH).

53. The base transceiver station of claim 50, wherein the at least one downlink non-anchor carrier does not carry a Secondary Common Control Physical channel (S-CCPCH).

54. The base transceiver station of claim 50, wherein the at least one downlink non-anchor carrier does not carry a Physical Random Access Channel (PRACH).

55. The base transceiver station of claim 50, wherein the at least one downlink non-anchor carrier does not carry a paging channel.

56. A base transceiver station in a radio network, the base transceiver station comprising:
  a receiver for receiving data from user equipment devices on at least one uplink carrier; and
  a transmitter for transmitting data to user equipment devices on a plurality of downlink carriers, the transmitter being configured to transmit at least one downlink anchor carrier with a first common channel, and transmit at least one downlink non-anchor carrier that does not carry the first common channel, transmissions of the at least one downlink anchor carrier overlapping in time with transmissions of the at least one downlink non-anchor carrier.

57. A method of operating a base transceiver station in a radio network, the method comprising:
- transmitting a first downlink anchor carrier with a first common channel;
- receiving a first signal from a user equipment device, the first signal notifying the base transceiver station that the user equipment device has acquired radio network system to which the base transceiver station belongs using the first downlink anchor carrier;
- transmitting a second downlink anchor carrier with the first common channel, the step of transmitting the second downlink anchor carrier overlapping in time with the step of transmitting the first downlink anchor carrier; and
- after receiving the first signal, sending to the user equipment device a second signal, the second signal notifying the user equipment device to acquire the radio network system using the second downlink anchor carrier.

58. The method of claim 57, further comprising:
- synchronizing the first and second downlink anchor carriers to the same timing reference.

59. The method of claim 57, further comprising:
- after receiving the first signal, sending the user equipment device a third signal notifying the user equipment device of timing offset of the second downlink anchor carrier with respect to the first downlink anchor carrier.

60. The method of claim 57, further comprising:
- after receiving the first signal, sending the user equipment device a third signal notifying the user equipment device of scrambling code of the second downlink anchor carrier.

61. The method of claim 57, wherein the first and second downlink anchor carriers use the same scrambling code.

62. The method of claim 61, further comprising:
- after receiving the first signal, sending the user equipment device a third signal notifying the user equipment device that the scrambling code of the second downlink anchor carrier is the same as the scrambling code of the first downlink anchor carrier.

63. A base transceiver station in a radio network, the base transceiver station comprising:
- a receiver for receiving data from user equipment devices on at least one uplink carrier;
- a transmitter for transmitting data to user equipment devices on a plurality of downlink carriers; and
- a processor controlling the transmitter and the receiver, wherein the processor is arranged to configure the transmitter and the receiver
  - to transmit a first downlink anchor carrier with a first common channel,
  - to receive a first signal from a first user equipment device, the first signal notifying the base transceiver station that the first user equipment device has acquired radio network system to which the base transceiver station belongs using the first downlink anchor carrier,
  - to transmit a second downlink anchor carrier with the first common channel, and
  - after receipt of the first signal, to send to the first user equipment device a second signal, the second signal notifying the first user equipment device to acquire the radio network system using the second downlink anchor carrier.

64. The base transceiver station of claim 63, wherein the processor is further arranged to configure the transmitter to synchronize the first and second downlink anchor carriers to the same timing reference.

65. The base transceiver station of claim 63, wherein the processor is further arranged to configure the transmitter to send to the first user equipment device a third signal notifying the first user equipment device of timing offset of the second downlink anchor carrier with respect to the first downlink anchor carrier, after receipt of the first signal.

66. The base transceiver station of claim 63, wherein the processor is further arranged to configure the transmitter to send to the first user equipment device a third signal notifying the user equipment device of scrambling code of the second downlink anchor carrier, after receipt of the first signal.

67. The base transceiver station of claim 63, wherein the first and second downlink anchor carriers use the same scrambling code.

68. The base transceiver station of claim 67, wherein the processor is further arranged to configure the transmitter to send to the first user equipment device a third signal notifying the first user equipment device that the scrambling code of the second downlink anchor carrier is the same as the scrambling code of the first downlink anchor carrier, after receiving the first signal.

69. A method of operating a user equipment device in a radio network, the method comprising:
- receiving from a base transceiver station of the radio network at least one downlink anchor carrier with full 3GPP Release 99 capability; and
- receiving from the base transceiver station at least one downlink non-anchor carrier with partial 3GPP Release 99 capability at the same time as receiving the at least one downlink anchor carrier.

70. A wireless user equipment device for communicating with a base transceiver station of a radio network, the wireless user equipment device comprising:
- a receiver; and
- a processing circuit;
- wherein the processing circuit is arranged to
  - configure the receiver to receive from a base transceiver station at least one downlink anchor carrier with full 3GPP Release 99 capability,
  - acquire radio network system using the at least one downlink carrier, and
  - configure the receiver to receive from the base transceiver station at least one downlink non-anchor carrier with partial 3GPP Release 99 capability at the same time as receiving the at least one downlink anchor carrier.

71. A method of operating a user equipment device in a radio network, the method comprising:
- receiving from a base transceiver station of the radio network at least one downlink anchor carrier with a first common channel;
- acquiring radio network system using the at least one downlink anchor carrier; and
- receiving payload data on at least one downlink non-anchor carrier that does not carry the first common channel, the step of receiving payload data overlapping in time with the step of receiving at least one downlink anchor carrier.

72. A wireless user equipment device for communicating with a radio network, the wireless user equipment device comprising:
- a receiver; and
- a processing circuit;
- wherein the processing circuit is arranged to
  - configure the receiver to receive from a base transceiver station of the radio network at least one downlink anchor carrier with a first common channel, acquire radio network system using the at least one downlink anchor carrier, and
configure the receiver to receive payload data on at least one downlink non-anchor carrier that does not carry the first common channel at the same time as receiving the at least one downlink anchor carrier.

73. A method of operating a base transceiver station in a radio network, the method comprising:
transmitting a first downlink anchor carrier with a first common channel;
transmitting a second downlink carrier;
receiving a first signal from a user equipment device, the first signal indicating that the user equipment device has acquired radio network system using the first downlink anchor carrier; and
after receiving the first signal, transmitting a second signal, the second signal commanding the user equipment device to receive the second downlink carrier.

74. The method of claim 73, further comprising:
after transmitting the second signal, receiving a third signal from the user equipment device, the third signal indicating that the user equipment device is ready to receive data using the second downlink carrier; and
after receiving the third signal, transmitting to the user equipment device data on the second downlink carrier.

75. A base transceiver station in a radio network, the base transceiver station comprising:
a receiver for receiving data from user equipment devices;
a transmitter for transmitting data to user equipment devices on a plurality of downlink carriers; and
a processor for controlling the receiver and the transmitter, wherein the processor is arranged
to configure the transmitter to transmit a first downlink anchor carrier with a first common channel and a second downlink carrier,
to configure the receiver to receive a first signal from a first user equipment device, the first signal indicating that the first user equipment device has acquired radio network system using the first downlink anchor carrier, and
to configure the transmitter to transmit, after receipt of the first signal, a second signal, the second signal commanding the first user equipment device to receive the second downlink carrier.

76. The base transceiver station of claim 75, wherein the processor is further arranged
to configure the receiver to receive, after transmission of the second signal, a third signal from the first user equipment device, the third signal indicating that the first user equipment device is ready to receive data using the second downlink carrier; and
to configure the transmitter to transmit, after receipt of the third signal, data on the second downlink carrier to the first user equipment device.

77. A method of operating a base transceiver station in a radio network, the method comprising:
transmitting a first downlink anchor carrier with a common channel;
receiving a first uplink carrier from a user equipment device;
transmitting a first signal, the first signal commanding the user equipment device to transmit a second uplink carrier; and
synchronizing to the second uplink carrier transmitted by the user equipment device.

78. The method of claim 77, further comprising:
after the step of synchronizing, transmitting a second signal, the second signal indicating to the user equipment device that the base transceiver station is ready to receive data on the second uplink carrier transmitted by the user equipment device; and
receiving data from the user equipment device on the second uplink carrier.

79. A base transceiver station in a radio network, the base transceiver station comprising:
a receiver for receiving data;
a transmitter for transmitting data on a plurality of downlink carriers; and
a processor controlling the receiver and the transmitter, wherein the processor is configured to
cause the transmitter to transmit a first downlink anchor carrier with a common channel,
cause the receiver to receive a first uplink carrier from a user equipment device,
cause the transmitter to transmit a first signal, the first signal commanding the user equipment device to transmit a second uplink carrier, and
synchronize the receiver to the second uplink carrier transmitted by the user equipment device.

80. The base transceiver station of claim 79, wherein the processor is further configured, after synchronizing the receiver,
to cause the transmitter to transmit a second signal, the second signal indicating to the user equipment device that the base transceiver station is ready to receive data on the second uplink carrier transmitted by the user equipment device; and
to cause the receiver to receive data from the user equipment device on the second uplink carrier.

81. A method of operating a user equipment device in a radio network, the method comprising:
receiving at the user equipment device a first downlink anchor carrier with a common channel from a base transceiver station;
transmitting at the user equipment device a first uplink carrier to the base transceiver station;
receiving at the user equipment device a first signal from the base transceiver station, the first signal commanding the user equipment device to transmit a second uplink carrier; and
transmitting the second uplink carrier in response to receiving the first signal.

82. The method of claim 81, further comprising:
receiving at the user equipment device a second signal from the base transceiver station, the second signal indicating to the user equipment device that the base transceiver station is ready to receive data on the second uplink carrier transmitted by the user equipment device; and
in response to receiving the second signal, transmitting data from the user equipment device to the base transceiver station on the second uplink carrier.

83. A wireless user equipment device for communicating with a base transceiver station of a radio network, the wireless user equipment device comprising:
a receiver;
a transmitter; and
a processing circuit, wherein the processing circuit is configured
to cause the receiver to receive from the base transceiver station a first downlink anchor carrier with a common channel, to cause the transmitter to transmit a first uplink carrier to the base transceiver station, to cause the receiver to receive a first signal from the base transceiver station, the first signal commanding the user equipment device to transmit a second uplink carrier, and to cause the transmitter to transmit the second uplink carrier in response to receiving the first signal.

84. The wireless user equipment device of claim 83, wherein the processing circuit is further configured to cause the receiver to receive a second signal from the base transceiver station, the second signal indicating to the user equipment device that the base transceiver station is ready to receive data on the second uplink carrier transmitted by the user equipment device; and to cause the transmitter to transmit data to the base transceiver station on the second uplink carrier in response to the second signal.

85. A wireless user equipment device for communicating with a base transceiver station of a radio network, the wireless user equipment device comprising:

means for receiving from the base transceiver station data on a first downlink carrier and on a second downlink carrier;

means for determining values of a first channel quality indicator for the first downlink carrier, and values of a second channel quality indicator for the second downlink carrier, one value of the first channel quality indicator per time slot, one value of the second channel quality indicator per time slot;

means for transmitting on a first uplink carrier to the base transceiver station channel quality indicator values in a CQI field, one CQI field per time slot; and means for encoding the CQI field for each time slot of a first plurality of time slots with (1) a value derived from the value of the first channel quality indicator corresponding to said each time slot of the first plurality of time slots, and (2) a value derived from the value of the second channel quality indicator corresponding to said each time slot of the first plurality of time slots, so that the CQI field transmitted on the first uplink carrier conveys information regarding channel quality of the first downlink carrier and information regarding channel quality of the second downlink carrier for said each time slot of the first plurality of time slots, wherein the CQI field includes both the first channel quality indicator and the second channel quality indicator for the first downlink carrier and the second downlink carrier in a single time slot.

86. The wireless user equipment device of claim 85, the means for encoding being further configured to obtain the value derived from the value of the first channel quality indicator corresponding to said each time slot of the first plurality of time slots by reducing resolution of the value of the first channel quality indicator corresponding to said each time slot of the first plurality of time slots.

87. The wireless user equipment device of claim 86, the means for encoding being further configured to obtain the value derived from the value of the second channel quality indicator corresponding to said each time slot of the first plurality of time slots by computing a difference between (1) the value of the second channel quality indicator corresponding to said each time slot of the first plurality of time slots, and (2) the value of the second channel quality indicator corresponding to a time slot immediately preceding said each time slot of the first plurality of time slots.

88. The wireless user equipment device of claim 87, the circuit being further configured to encode the CQI field for said each time slot of the first plurality of time slots with an ACK/NAK acknowledgment value that corresponds to payload data received by the wireless user device from the base transceiver station on a downlink carrier.

89. A wireless user equipment device for communicating with a base transceiver station of a radio network, the wireless user equipment device comprising:

means for receiving from the base transceiver station data on a plurality of downlink carriers;

means for determining values of a channel quality indicator for each downlink carrier of the plurality of downlink carriers;

means for transmitting on a first uplink carrier to the base transceiver station channel quality indicator values in a CQI field, one CQI field per time slot; and means for selecting for each time slot a selected downlink carrier from the plurality of downlink carriers, each downlink carrier of the plurality of downlink carriers being selected once in a cycle period; and means for encoding the CQI field with the channel quality indicator of the selected downlink carrier for said each time slot, wherein the CQI field includes the values of the channel quality indicators for each downlink carrier of the plurality of downlink carriers in a single time slot.

90. A wireless user equipment device for communicating with a base transceiver station of a radio network, the wireless user equipment device comprising:

means for receiving from the base transceiver station data on a plurality of downlink carriers;

means for determining values of a channel quality indicator for each downlink carrier of the plurality of downlink carriers;

means for transmitting on a first uplink carrier to the radio network data in a FeedBack Indicator (FBI) field, one FBI field per time slot; and means for encoding the FBI field with at least a portion of a value of a channel quality indicator of a first downlink carrier selected from the plurality of downlink carriers, wherein the FBI field includes the values of the channel quality indicators for each downlink carrier of the plurality of downlink carriers in a single time slot.

91. The wireless user equipment device of claim 90, wherein:

the means for transmitting is configured to transmit on the first uplink carrier to the base transceiver station network data in a CQI field, one CQI field per time slot; and the means for encoding is configured to encode the CQI field with a value of a channel quality indicator of a second downlink carrier selected from the plurality of downlink carriers.

92. A base transceiver station in a radio network, for communicating with a wireless user equipment device, the base transceiver station comprising:

means for receiving data from the wireless user equipment device on a first uplink carrier, the first uplink carrier including a channel with a CQI field;

means for transmitting data to the wireless user equipment device on a first downlink carrier and on a second downlink carrier; and means for processing configured to:

receive values in the CQI field, one received value in the CQI field per time slot, adjust output power of the first downlink carrier in accordance with a first subfield of the received value in the CQI field in each time slot, and adjust output power of the second downlink carrier in accordance with a second subfield of the received value in the CQI field in said each time slot, wherein the CQI field includes both a first channel quality indicator and a second channel quality indicator for the first downlink carrier and the second downlink carrier in a single time slot.

93. The base transceiver station of claim 92, wherein the means for processing is further configured to:
read a third subfield of the received value in the CQI field, and
if the third subfield has a first value, inform a radio network controller of the radio network that at least one packet sent on a downlink carrier to the wireless user equipment device has been successfully received by the wireless user equipment device.

94. The base transceiver station of claim 92, wherein:
the first uplink carrier includes a channel with a FeedBack Information (FBI) field;
the means for processing is further configured to inform a radio network controller of the radio network that at least one packet sent on a downlink carrier to the wireless user equipment device has been successfully received by the wireless user equipment device, if a third subfield of the FBI field has a first predetermined value.

95. A method of operating a wireless user equipment device for communicating with a base transceiver station of a radio network, the method comprising:
a step for receiving from the base transceiver station data on a first downlink carrier and on a second downlink carrier;
a step for determining values of a first channel quality indicator for the first downlink carrier, one value of the first channel quality indicator per time slot;
a step for determining values of a second channel quality indicator for the second downlink carrier, one value of the second channel quality indicator per time slot;
a step for transmitting on a first uplink carrier to the radio network channel quality indicator values in a CQI field, one CQI field per time slot; and
a step for encoding the CQI field for each time slot of a first plurality of time slots with a value derived from the value of the first channel quality indicator corresponding to said each time slot of the first plurality of time slots, and a value derived from the value of the second channel quality indicator corresponding to said each time slot of the first plurality of time slots, wherein the CQI field includes both the first channel quality indicator and the second channel quality indicator for the first downlink carrier and the second downlink carrier in a single time slot.

96. A method of operating a wireless user equipment device for communicating with a base transceiver station of a radio network, the method comprising:
a step for receiving from the base transceiver station data on a plurality of downlink carriers;
a step for determining values of a channel quality indicator for each downlink carrier of the plurality of downlink carriers;
a step for transmitting on a first uplink carrier to the radio network channel quality indicator values in a CQI field, one CQI field per time slot;
a step for selecting for each time slot a selected downlink carrier from the plurality of downlink carriers, each downlink carrier of the plurality of downlink carriers being selected once in a cycle period; and
a step for encoding the CQI field with the channel quality indicator of the selected downlink carrier for said each time slot, so that the CQI field transmitted on the first uplink carrier conveys information regarding channel quality of said each downlink carrier once within the cycle period, wherein the CQI field includes the values of the channel quality indicators for each downlink carrier of the plurality of downlink carriers in a single time slot.

97. A method of operating a wireless user equipment device for communicating with a base transceiver station of a radio network, the method comprising:
a step for receiving from the base transceiver station data on a plurality of downlink carriers;
a step for determining values of channel quality indicator for each downlink carrier of the plurality of downlink carriers;
a step for transmitting on a first uplink carrier to the radio network data in a FeedBack Indicator (FBI) field, one FBI field per time slot; and
a step for encoding the FBI field with at least a portion of a value of a channel quality indicator of a first downlink carrier selected from the plurality of downlink carriers, wherein the FBI field includes the values of the channel quality indicators for each downlink carrier of the plurality of downlink carriers in a single time slot.

98. A method of operating a base transceiver station in a radio network, the method comprising:
a step for receiving data from a wireless user equipment device on a first uplink carrier, the first uplink carrier including a channel with a CQI field;
a step for transmitting data to the wireless user equipment device on a first downlink carrier and on a second downlink carrier;
a step for reading values received in the CQI field, one value received in the CQI field per time slot;
a step for adjusting output power of the first downlink carrier in accordance with a first subfield of the value received in the CQI field in each time slot; and
a step for adjusting output power of the second downlink carrier in accordance with a second subfield of the value received in the CQI field in said each time slot, wherein the CQI field includes both a first channel quality indicator and a second channel quality indicator for the first downlink carrier and the second downlink carrier in a single time slot.

99. A method of operating a base transceiver station in a radio network, the method comprising:
a step for transmitting at least one downlink anchor carrier with full 3GPP Release 99 capability; and
a step for transmitting at least one downlink non-anchor carrier with partial 3GPP Release 99 capability, the step for transmitting at least one downlink non-anchor carrier overlapping in time with the step for transmitting at least one downlink anchor carrier.

100. A method of operating a base transceiver station in a radio network, the method comprising:
a step for transmitting at least one downlink anchor carrier with a first common channel; and
a step for transmitting at least one downlink non-anchor carrier that does not carry the first common channel, the step for transmitting at least one downlink non-anchor carrier overlapping in time with the step for transmitting at least one downlink anchor carrier.

101. A base transceiver station in a radio network, the base transceiver station comprising:
- means for receiving data from user equipment devices on at least one uplink carrier; and
- means for transmitting data to user equipment devices on a plurality of downlink carriers, the means for transmitting being configured to transmit at least one downlink anchor carrier with full 3GPP Release 99 capability, and transmit at least one downlink non-anchor carrier with partial 3GPP Release 99 capability, transmissions of the at least one downlink anchor carrier overlapping in time with transmissions of the at least one downlink non-anchor carrier.

102. The base transceiver station of claim 101, wherein the at least one downlink non-anchor carrier does not carry a synchronization timing channel (SCH).

103. A base transceiver station in a radio network, the base transceiver station comprising:
- means for receiving data from user equipment devices on at least one uplink carrier; and
- means for transmitting data to user equipment devices on a plurality of downlink carriers, the means for transmitting being configured to transmit at least one downlink anchor carrier with a first common channel, and transmit at least one downlink non-anchor carrier that does not carry the first common channel, transmissions of the at least one downlink anchor carrier overlapping in time with transmissions of the at least one downlink non-anchor carrier.

104. A method of operating a base transceiver station in a radio network, the method comprising:
- a step for transmitting a first downlink anchor carrier with a first common channel;
- a step for receiving a first signal from a user equipment device, the first signal notifying the base transceiver station that the user equipment device has acquired radio network system to which the base transceiver station belongs using the first downlink anchor carrier;
- a step for transmitting a second downlink anchor carrier with the first common channel, the step for transmitting the second downlink anchor carrier overlapping in time with the step for transmitting the first downlink anchor carrier; and
- a step for sending to the user equipment device a second signal, after receiving the first signal, the second signal notifying the user equipment device to acquire the radio network system using the second downlink anchor carrier.

105. A base transceiver station in a radio network, the base transceiver station comprising:
- means for receiving data from user equipment devices on at least one uplink carrier;
- means for transmitting data to user equipment devices on a plurality of downlink carriers; and
- means for controlling the means for receiving and the means for transmitting, wherein the means for controlling is arranged to configure the means for transmitting and the means for receiving
    - to transmit a first downlink anchor carrier with a first common channel,
    - to receive a first signal from a first user equipment device, the first signal notifying the base transceiver station that the first user equipment device has acquired radio network system to which the base transceiver station belongs using the first downlink anchor carrier,
    - to transmit a second downlink anchor carrier with the first common channel, and
    - after receipt of the first signal, to send to the first user equipment device a second signal, the second signal notifying the first user equipment device to acquire the radio network system using the second downlink anchor carrier.

106. The base transceiver station of claim 105, wherein the means for controlling is further arranged to configure the means for transmitting to synchronize the first and second downlink anchor carriers to the same timing reference.

107. The base transceiver station of claim 105, wherein the means for controlling is further arranged to configure the means for transmitting to send to the first user equipment device a third signal notifying the first user equipment device of timing offset of the second downlink anchor carrier with respect to the first downlink anchor carrier, after receipt of the first signal.

108. The base transceiver station of claim 105, wherein the means for controlling is further arranged to configure the means for transmitting to send to the first user equipment device a third signal notifying the user equipment device of scrambling code of the second downlink anchor carrier, after receipt of the first signal.

109. A method of operating a user equipment device in a radio network, the method comprising:
- a step for receiving from a base transceiver station of the radio network at least one downlink anchor carrier with full 3GPP Release 99 capability; and
- a step for receiving from the base transceiver station at least one downlink non-anchor carrier with partial 3GPP Release 99 capability at the same time as receiving the at least one downlink anchor carrier.

110. A wireless user equipment device for communicating with a base transceiver station of a radio network, the wireless user equipment device comprising:
- means for receiving downlink carriers; and
- means for controlling the means for receiving;
- wherein the means for controlling is arranged to
    - configure the means for receiving to receive from a base transceiver station at least one downlink anchor carrier with full 3GPP Release 99 capability,
    - acquire radio network system using the at least one downlink anchor carrier, and
    - configure the means for receiving to receive from the base transceiver station at least one downlink non-anchor carrier with partial 3GPP Release 99 capability at the same time as receiving the at least one downlink anchor carrier.

111. A method of operating a user equipment device in a radio network, the method comprising:
- a step for receiving from a base transceiver station of the radio network at least one downlink anchor carrier with a first common channel;
- a step for acquiring radio network system using the at least one downlink anchor carrier; and
- a step for receiving payload data on at least one downlink non-anchor carrier that does not carry the first common channel, the step for receiving payload data overlapping in time with the step for receiving at least one downlink anchor carrier.

112. A wireless user equipment device for communicating with a radio network, the wireless user equipment device comprising:
- means for receiving downlink carriers; and
- means for controlling arranged to configure the means for receiving to receive from a base transceiver station of the radio network at least one downlink anchor carrier with a first common channel,
acquire radio network system using the at least one downlink anchor carrier, and
configure the means for receiving to receive payload data on at least one downlink non-anchor carrier that does not carry the first common channel at the same time as receiving the at least one downlink anchor carrier.

113. A method of operating a base transceiver station in a radio network, the method comprising:
a step for transmitting a first downlink anchor carrier with a first common channel;
a step for transmitting a second downlink carrier;
a step for receiving a first signal from a user equipment device, the first signal indicating that the user equipment device has acquired radio network system using the first downlink anchor carrier; and
a step for transmitting a second signal, after receiving the first signal, the second signal commanding the user equipment device to receive the second downlink carrier.

114. A base transceiver station in a radio network, the base transceiver station comprising:
means for receiving data from user equipment devices;
means for transmitting data to user equipment devices on a plurality of downlink carriers; and
means for controlling the means for receiving and the means for transmitting, wherein the means for controlling is arranged
to configure the means for transmitting to transmit a first downlink anchor carrier with a first common channel and a second downlink carrier,
to configure the means for receiving to receive a first signal from a first user equipment device, the first signal indicating that the first user equipment device has acquired radio network system using the first downlink anchor carrier, and
to configure the means for transmitting to transmit, after receipt of the first signal, a second signal, the second signal commanding the first user equipment device to receive the second downlink carrier.

115. A method of operating a base transceiver station in a radio network, the method comprising:
a step for transmitting a first downlink anchor carrier with a common channel;
a step for receiving a first uplink carrier from a user equipment device;
a step for commanding the user equipment device to transmit a second uplink carrier; and
a step for synchronizing to the second uplink carrier transmitted by the user equipment device.

116. A base transceiver station in a radio network, the base transceiver station comprising:
means for receiving data;
means for transmitting data on a plurality of downlink carriers; and
means for controlling the means for receiving and the means for transmitting, wherein the means for controlling is configured to
cause the means for transmitting to transmit a first downlink anchor carrier with a common channel,
cause the means for receiving to receive a first uplink carrier from a user equipment device, and
cause the means for transmitting to transmit a first signal, the first signal commanding the user equipment device to transmit a second uplink carrier; and
means for synchronizing the means for receiving to the second uplink carrier transmitted by the user equipment device.

117. A method of operating a user equipment device in a radio network, the method comprising:
a step for receiving at the user equipment device a first downlink anchor carrier with a common channel from a base transceiver station;
a step for transmitting at the user equipment device a first uplink carrier to the base transceiver station;
a step for receiving at the user equipment device a first signal from the base transceiver station, the first signal commanding the user equipment device to transmit a second uplink carrier; and
a step for transmitting the second uplink carrier in response to receiving the first signal.

118. A wireless user equipment device for communicating with a base transceiver station of a radio network, the wireless user equipment device comprising:
means for receiving;
means for transmitting; and
means for controlling the means for receiving and the means for transmitting, wherein the means for controlling is configured
to cause the means for receiving to receive from the base transceiver station a first downlink anchor carrier with a common channel,
to cause the means for transmitting to transmit a first uplink carrier to the base transceiver station,
to cause the means for receiving to receive a first signal from the base transceiver station, the first signal commanding the user equipment device to transmit a second uplink carrier, and
to cause the means for transmitting to transmit the second uplink carrier in response to receiving the first signal.

119. A machine-readable medium comprising instructions, the instructions when executed by at least one processor of a wireless user equipment device, cause the wireless user equipment device to perform operations comprising:
receiving from a base transceiver station of a radio network data on a first downlink carrier and on a second downlink carrier;
determining values of a first channel quality indicator for the first downlink carrier, one value of the first channel quality indicator per time slot;
determining values of a second channel quality indicator for the second downlink carrier, one value of the second channel quality indicator per time slot;
transmitting on a first uplink carrier to the radio network channel quality indicator values in a CQI field, one CQI field per time slot; and
encoding the CQI field for each time slot of a first plurality of time slots with a value derived from the value of the first channel quality indicator corresponding to said each time slot of the first plurality of time slots, and a value derived from the value of the second channel quality indicator corresponding to said each time slot of the first plurality of time slots, wherein the CQI field includes both the first channel quality indicator and the second channel quality indicator for the first downlink carrier and the second downlink carrier in a single time slot.

120. A machine-readable medium comprising instructions, the instructions, when executed by at least one processor of a base transceiver station in a radio network, cause the base transceiver station to perform operations comprising:
- receiving data from a wireless user equipment device on a first uplink carrier, the first uplink carrier including a channel with a CQI field;
- transmitting data to the wireless user equipment device on a first downlink carrier and on a second downlink carrier; and
- reading values received in the CQI field, one value received in the CQI field per time slot;
- adjusting output power of the first downlink carrier in accordance with a first subfield of the value received in the CQI field in each time slot;
- adjusting output power of the second downlink carrier in accordance with a second subfield of the value received in the CQI field in said each time slot, wherein the CQI field includes both a first channel quality indicator and a second channel quality indicator for the first downlink carrier and the second downlink carrier in a single time slot.

121. A machine-readable medium comprising instructions, the instructions, when executed by at least one processor of a base transceiver station in a radio network, cause the base transceiver station to perform operations comprising:
- transmitting at least one downlink anchor carrier with full 3GPP Release 99 capability; and
- transmitting at least one downlink non-anchor carrier with partial 3GPP Release 99 capability, the step of transmitting at least one downlink non-anchor carrier overlapping in time with the step of transmitting at least one downlink anchor carrier.

122. A machine-readable medium comprising instructions, the instructions, when executed by at least one processor of a base transceiver station in a radio network, cause the base transceiver station to perform operations comprising:
- transmitting a first downlink anchor carrier with a first common channel;
- receiving a first signal from a user equipment device, the first signal notifying the base transceiver station that the user equipment device has acquired radio network system to which the base transceiver station belongs using the first downlink anchor carrier;
- transmitting a second downlink anchor carrier with the first common channel, the step of transmitting the second downlink anchor carrier overlapping in time with the step of transmitting the first downlink anchor carrier; and
- after receiving the first signal, sending to the user equipment device a second signal, the second signal notifying the user equipment device to acquire the radio network system using the second downlink anchor carrier.

123. A machine-readable medium comprising instructions, the instructions, when executed by at least one processor of a wireless user equipment device, cause the wireless user equipment device to perform operations comprising:
- receiving from a base transceiver station of a radio network at least one downlink anchor carrier with full 3GPP Release 99 capability; and
- receiving from the base transceiver station at least one downlink non-anchor carrier with partial 3GPP Release 99 capability at the same time as receiving the at least one downlink anchor carrier.

* * * * *